United States Patent
Hattori

(10) Patent No.: US 7,280,234 B2
(45) Date of Patent: Oct. 9, 2007

(54) IMAGE PROCESSING DEVICE

(75) Inventor: Hiroshi Hattori, Gifu-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 493 days.

(21) Appl. No.: 10/807,297

(22) Filed: Mar. 24, 2004

(65) Prior Publication Data

US 2004/0207861 A1 Oct. 21, 2004

(30) Foreign Application Priority Data

Mar. 25, 2003 (JP) ............................. 2003-082773

(51) Int. Cl.
*G06K 1/00* (2006.01)
*G06K 9/00* (2006.01)
*G06T 1/00* (2006.01)

(52) U.S. Cl. .................. 358/1.1; 382/181; 345/522

(58) Field of Classification Search ................ 345/501, 345/522, 530, 536, 537, 557, 564; 358/1.1; 710/1, 35; 382/181
See application file for complete search history.

(56) References Cited

U.S. PATENT DOCUMENTS

| | | | |
|---|---|---|---|
| 5,923,790 A * | 7/1999 | Miwa et al. ................ 382/289 |
| 6,348,975 B1 * | 2/2002 | Tsunekawa et al. ........ 358/1.17 |
| 6,359,695 B1 * | 3/2002 | Takahashi et al. ........... 358/1.1 |
| 6,374,033 B2 * | 4/2002 | Hoshi .......................... 386/32 |
| 6,687,401 B2 * | 2/2004 | Naoi et al. .................. 382/190 |
| 6,708,236 B1 * | 3/2004 | Date et al. ..................... 710/35 |
| 6,930,808 B2 * | 8/2005 | Otani .......................... 358/515 |

FOREIGN PATENT DOCUMENTS

JP  A 2002-63582  2/2002

* cited by examiner

*Primary Examiner*—Kee M. Tung
*Assistant Examiner*—Joni Hsu
(74) *Attorney, Agent, or Firm*—Oliff & Berridge, PLC

(57) ABSTRACT

If the width of a rectangle to be drawn by a drawing command is less than or equal to a first reference value that is previously determined dependently on the length of one record of cache memory, the drawing command for the rectangle is held in a rectangular drawing command storage area in a RAM. If several rectangles held in the rectangular drawing command storage constitute a lateral-direction gradation pattern, a drawing command group that draws the rectangles is converted into a secondary drawing command that repeatedly draws in an auxiliary scanning direction a virtual-image of one line that constitutes the lateral-direction gradation pattern and that extends in the main scanning direction. There is no need to overwrite the record in the cache memory while generating drawing data based on the secondary drawing command because the width of the virtual-image is less than or equal to the width of one record in the cache memory.

22 Claims, 10 Drawing Sheets

IMAGE PROCESSING DEVICE

BACKGROUND OF THE INVENTION

1. Field of the Invention

The present invention relates to an image processing device that generates drawing data for forming an image while scanning in a main scanning direction.

2. Description of Related Art

With a conventional image forming device, such as a laser printer or copier, drawing data is developed in a storage area of a memory device. The drawing data is image data in a bitmap form that represents each pixel in an image to be formed. Based on the drawing data, scan of one line of the image is performed in a main scanning direction, and scan of successive lines of the image is performed in an auxiliary scanning direction, which is perpendicular to the main scanning direction, whereby the image is formed on a recording medium or the like.

A personal computer is connected to the image forming device. Print commands are outputted from a source such as an application program running on the personal computer. The print commands are inputted to an image processing device, which is provided in the image forming device. In the image processing device, a plurality of drawing commands included within the print commands are executed to draw a virtual image on a virtual image drawing region, which is defined on a storage area of the memory device, for example, thereby generating drawing data (bitmap data) indicative of the virtual image.

Representative examples of the drawing commands include: virtual-image drawing commands for designating positions at which bitmap images (drawing data) are to be drawn; and graphic pattern/font drawing commands that employ data of the coordinates of vertices in a graphic and that employ vector data specifying links between the vertices and data specifying whether or not a framework obtained by the links is to be filled with a color. In order to create a virtual image of a graphic pattern on the storage area of the memory device by using vector data, for example, the graphic pattern to be drawn according to the drawing command is scanned in the main scanning direction, and each pixel of the graphic pattern is drawn virtually into the storage area of the memory device.

An entire image is formed by repeatedly superposing patterns so that the patterns (images, graphic patterns, and/or fonts) which are drawn virtually according to the drawing commands are overwritten by other patterns that are drawn later. Drawing commands specify the positions at which the corresponding patterns are to be drawn over the already-drawn images. An image is finally created in bitmap form and is formed on a recording medium.

The memory device has a storage area, in which a plurality of sets of pixel data are arranged in such a manner that a plurality of pixel groups are arranged sequentially from a leading end to a trailing end of an image along the auxiliary scanning direction and that a plurality of sets of pixel data are arranged in each pixel group from one edge to the other edge of the image in the main scanning direction. Each pixel group therefore includes data for a corresponding line that extends in the main scanning direction.

In other words, in the memory device, storage sections for a plurality of successive lines are provided sequentially from the first line, followed by the second line, the third line, and so on. The storage section for each line stores therein a plurality of successive sets of pixel data, starting from data for the pixel at the start of the scanning direction (the main scanning direction) of the subject line up until data for the pixel at the end of the subject line.

A graphic pattern or the like is drawn virtually on the storage area of the memory device. In order to convert a graphic pattern or the like into drawing data, the start address of a storage section is designated for each scan line (hereinafter called "line") of the subject graphic pattern or the like. The start address indicates the storage portion for storing data for a pixel (start pixel) located at the start of the subject line (the upstream end of the subject line in the scanning direction). When the graphic pattern or the like is converted into drawing data, pixel data in the drawing data for the start pixel on the subject line is stored in the storage portion specified by the corresponding address. Other pixel data on the subject line is stored in other storage portions that are specified by addresses that are designated relative to the address for the start pixel of the same line.

If some graphic pattern is long in the auxiliary scanning direction, the graphic pattern is made from a large number of lines, each of which extends in the main scanning direction. In such a case, in order to convert the graphic pattern into drawing data, it is necessary to designate an address of the start of line many times. It becomes impossible to store pixel data in consecutive storage portions. The speed at which the graphic pattern is formed decreases.

Especially, now consider a lateral-direction gradation pattern or array pattern, in which a plurality of graphic patterns are consecutively arranged along the main scanning direction and each graphic pattern is long in the auxiliary scanning direction. If the plurality of graphic patterns are drawn one by one when converting the drawing commands for the plurality of graphic patterns into drawing data, the drawing performance for the entire image will decrease.

Japanese unexamined Patent Application Publication No. 2002-63582 has proposed a method of improving the drawing performance in the above-described case. According to this method, drawing commands for drawing a lateral-direction gradation pattern, whose color tone varies in the main scanning direction (lateral direction), are converted into a secondary drawing command for repeatedly drawing in the auxiliary scanning direction a gradation line that extends in the main scanning direction.

SUMMARY OF THE INVENTION

However, the above-described method for converting drawing commands into secondary drawing commands raises a problem in that, if each graphic pattern that is long in the auxiliary scanning direction has a certain amount of width in the main scanning direction as well, the number of graphic patterns connected together in the main scanning direction decreases. The difference between the time required for converting the drawing commands into the secondary drawing command and the time saved by generating the secondary drawing command decreases. In the worst case, it becomes paradoxically more efficient, from the time point of view, to fail to convert the drawing commands into secondary drawing commands than to convert the drawing commands into secondary drawing commands.

In view of the above-described drawbacks, it is an objective of the present invention to provide an improved image processing device that can ensure improvement of the drawing performance for any lateral-direction gradation pattern or array pattern.

In order to attain the above and other objects, the present invention provides an image processing device for creating, based on a drawing command, drawing data to be used for forming an image while scanning in a main scanning direction. The image processing device includes: storage means; command receiving means; graphic determination means; graphic width determination means; graphic pattern determination means; command conversion means; and drawing data generation means. The storage means is prestored with a predetermined first reference value. The command receiving means is for receiving drawing commands in succession. The graphic determination means is for determining whether or not a graphic pattern to be drawn by each drawing command has a predetermined shape. The graphic width determination means is for determining, when the graphic determination means determines that the graphic pattern has the predetermined shape, whether or not a width of the graphic pattern in a main scanning direction is less than or equal to the first reference value. The graphic pattern determination means is for holding the drawing command when the graphic width determination means determines that the width of the corresponding graphic pattern is less than or equal to the first reference value, and, determining, when the graphic pattern determination means holds a plurality of drawing commands, whether or not the graphic patterns indicated by the plurality of drawing commands constitute an array pattern, in which the corresponding graphic patterns are arranged consecutively in the main scanning direction. The command conversion means is for converting, when the graphic pattern determination means determines that the plurality of graphic patterns indicated by the plurality of drawing commands constitute the array pattern, the plurality of drawing commands into one or more secondary drawing command to draw one or more secondary graphic pattern, the one of more secondary graphic pattern being defined by combining the plurality of graphic patterns together in the main scanning direction. The drawing data generation means is for generating, based on the one or more secondary drawing command, drawing data to be used for forming the one or more secondary graphic pattern while scanning in the main scanning direction.

According to another aspect, the present invention provides at image processing device for creating, based on a drawing command, drawing data to be used for forming an image while scanning in a main scanning direction. The image processing device includes: a storage portion prestored with a predetermined first reference value; a memory; and a controller. The controller receives drawing commands in succession; determines whether or not a graphic pattern to be drawn by each drawing command has a predetermined shape; determines, when the graphic pattern has the predetermined shape, whether or not a width of the graphic pattern in a main scanning direction is less than or equal to the first reference value; holds in the memory the drawing command when the width of the corresponding graphic pattern is less than or equal to the first reference value: determines, when a plurality of drawing commands are held in the memory, whether or not the graphic patterns indicated by the plurality of drawing commands constitute an array pattern, in which the corresponding graphic patterns are arranged consecutively in the main scanning direction; converts, when the plurality of graphic patterns indicated by the plurality of drawing commands constitute the array pattern, the plurality of drawing commands into one or more secondary drawing command to draw one or more secondary graphic pattern, the one or more secondary graphic pattern being defined by combining the plurality of graphic patterns together in the main scanning direction; and generates, based on the one or more secondary drawing command, drawing data to be used for forming the one or more secondary graphic pattern while scanning in the main scanning direction.

BRIEF DESCRIPTION OF THE DRAWINGS

The above and other objects, features and advantages of is the invention will become more apparent from reading the following description of the preferred embodiments taken in connection with the accompanying drawings in which:

FIG. 9($b$) is a flowchart of a drawing command converting process in the intermediate print command generation process of FIG. 9($a$).

DETAILED DESCRIPTION OF THE PREFERRED EMBODIMENT

Figure 1:
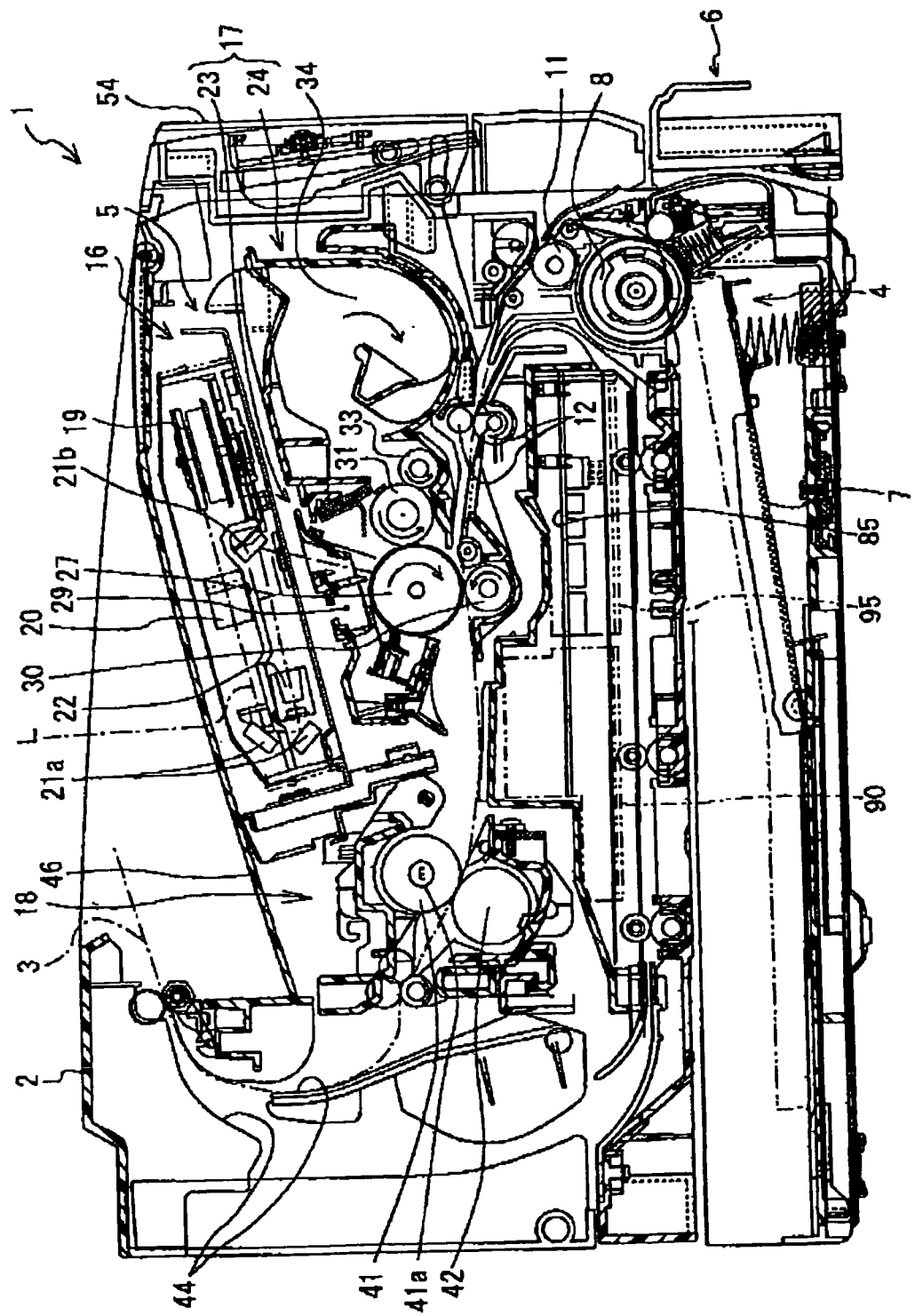
FIG. 1 shows a section taken along the center of a laser printer according to an embodiment of the present invention.

A laser printer according to a preferred embodiment of the present invention will be described while referring to the accompanying drawings wherein like parts and components are designated by the same reference numerals to avoid duplicating description.

First, overall structure of the laser printer 1 of the embodiment will be described with reference to FIG. 1.

As shown in FIG. 1, the laser printer 1 includes a feeder section 4, and an image forming section 5, all accommodated in a main body case 2. The feeder section 4 is adapted for feeding sheets 3. The image forming section 5 is adapted for forming an image on each fed sheet 3, and includes a scanner unit 16, a process cartridge 17, and a fixing unit 18. Note that the right side of FIG. 1 is the front side of the laser printer 1.

A paper supply cassette 6 is mounted removably into a base portion of the case 2. The paper 3 is held in a stack on top of a paper pressure plate 7 provided in the paper supply cassette 6, and is pressed by the paper pressure plate 7 towards a paper supply roller 8, which is provided above the paper supply cassette 6 at the front surface side of the case 2. As the paper supply roller 8 rotates, the paper 3 is transported by a feed roller 11 along a U-shaped transport path, and is fed from resist rollers 12 towards the image forming section 5, which is provided in a substantially central portion of the main body case 2.

A low-voltage power source circuit board 90, a high-voltage power source circuit board 95, and an engine circuit board 85 are provided in a location above the paper supply cassette 6 and below the image forming section 5.

The low-voltage power source circuit board 90 functions to drop the voltage supplied from a source external to the laser printer 1, such as a single-phase 100V source, to a voltage of 24V, for example, to be supplied to components in the laser printer 1. The high-voltage power source circuit board 95 generates a high-voltage bias that is applied to components in the processing cartridge 17. The engine circuit board 85 drives a drive motor (not shown), a solenoid (not shown), and a laser emitting section (not shown). The drive motor is the source for driving parts involved in mechanical operations, such as the rollers in the laser printer 1. The solenoid (not shown) is adapted for switching the operating direction of a drive system.

A control board 100 (FIG. 2) is provided between the right side of the main body case 2 and the frame (not shown) disposed at right side of the main casing 2. This control board 100 controls various parts of the laser printer 1. The control board 100 is disposed in an orientation in which its surface is substantially in parallel to the right side of the main casing 2. Detailed description of the control board 100 will be provided later.

The scanner unit 16 of the image forming section 5 is disposed directly below a sheet discharge tray 46 in the main body case 2, and includes the laser beam emitting section (not shown), a polygon mirror 19, an fθ lens 20, reflecting mirrors 21a, 21b, and a cylindrical lens 22. The laser beam emitting section irradiates a laser beam. The polygon mirror 19 rotates to scan the laser beam from the laser beam emitting section in a main scanning direction across the surface of a photosensitive drum 27. The fθ lens 20 is for stabilizing scanning speed of the laser beam reflected from the polygon mirror 19. The reflecting mirrors 21a, 21b are for reflecting the laser beam. The cylindrical lens 22 is for compensating for the cross-scan error (optical face tangle error) and for imaging the laser beam from the reflecting mirrors 21a, 21b onto the photosensitive drum 27. With this configuration, the laser beam is irradiated from the laser beam emitting section based upon predetermined image data and passes through or is reflected by the polygon mirror 19, the fθ lens 20, the reflecting mirror 21a, the cylindrical lens 22 and the reflecting mirror 21b in this order as indicated by an alternate long and dash lines L in FIG. 1 to expose and scan the surface of the photosensitive drum 27 of the process cartridge 17.

The process cartridge 17 includes a drum cartridge 23 and a developing cartridge 24 that is detachably mounted on the drum cartridge 23. The drum cartridge 23 includes the photosensitive drum 27, a scorotron charger 29, and a transfer roller 30. The developing cartridge 24 includes a developing roller 31, a toner supply roller 33, and a toner hopper 34. A space that holds a process cartridge 17 is provided in a portion close to the front upper surface of the main body case 2. The space is open to the front side so that the process cartridge 17 can be inserted thereinto. A cover 54 that pivots downward is provided on a front side (right end side in FIG. 1) of the main body case 2 for covering the space. A process cartridge 17 is inserted and removed where the cover 54 is opened widely.

The photosensitive drum 27 is arranged in the drum cartridge 23 so as to contact the developing roller 31. The photosensitive drum 27 is rotatable clockwise as indicated by an arrow in FIG. 1. The photosensitive drum 27 includes a conductive base and a positively charging organic photosensitive body coated on the conductive base. The positively charging organic photosensitive body is made from a charge transfer layer dispersed with a charge generation material. When the photosensitive drum 27 is exposed to a laser beam, the charge generation material absorbs the light and generates a charge. The charge is transferred onto the surface of the photosensitive drum 27 and the conductive base through the charge transfer layer and counteracts the surface potential charged by the scorotron charger 29. As a result, a potential difference is generated between regions of the photosensitive drum 27 that have been exposed to laser beam and regions that have not been exposed to the laser beam. By selectively exposing and scanning the surface of the photosensitive drum 27 with a laser beam based upon print data, an electrostatic latent image is formed on the photosensitive drum 27.

The Scorotron charger 29 is disposed above the photosensitive drum 27. The Scorotron charger 29 is separated from and out of contact from the photosensitive drum 27 by a predetermined distance. The Scorotron charger 29 generates a corona discharge from a wire made from tungsten, for example, and is turned ON by the high-voltage power source circuit board 95 for charging the surface of the photosensitive drum 27 to a uniform charge of positive polarity.

The developing roller 31 is disposed downstream of the scorotron charger 29 with respect to the rotation direction of the photosensitive drum 27, and is rotatable in the counterclockwise as indicated by an arrow in FIG. 1. The developing roller 31 includes a roller shaft made from metal and a roller covered over the roller shaft. The roller is made from a conductive rubber material. A development bias is applied to the developing roller 31 from the high-voltage power source circuit board 95.

The toner supply roller 33 is rotatably disposed beside the developing roller 31 on the opposite side from the photosensitive drum 27 across the developing roller 31. The toner supply roller 33 is in pressed contact with the developing roller 31. The toner supply roller 33 includes a roller shaft made of metal and a roller disposed over the roller shaft. The roller is made of a conductive foam material and is adapted to triboelectrify the toner to be supplied to the developing roller 31. To this effect, the toner supply roller 33 is rotatable counterclockwise as indicated by an arrow in FIG. 1. This is the same rotation direction as developing roller 31.

The toner hopper 34 is provided beside the toner supply roller 33. The inside of the toner hopper 34 is filled with developer to be supplied to the developing roller 31 by way of the toner supply roller 33, In this embodiment, non-magnetic, single-component toner with a positive charging nature is used as a developer. The toner is a polymeric toner obtained by copolymerizing polymeric monomers using a well-known polymerization method such as suspension polymerization. Examples of polymeric monomers include styrene monomers and acrylic monomers. Styrene is an example of a styrene monomer. Examples of acrylic monomers include acrylic acid, alkyl (C1 to C4) acrylate, and alkyl (C1 to C4) methacrylate. A coloring agent, such as carbon black, and wax are mixed in the polymeric toner. An external additive such as silica is also added in order to improve fluidity. Particle diameter of the external additive is approximately 6 to 10 μm.

A transfer roller 30 is disposed below the photosensitive drum 27 and downstream from the developing roller 31 with respect to the rotating direction of the photosensitive drum 27. The transfer roller 30 is rotatable counterclockwise as indicated by an arrow in FIG. 1. The transfer roller 30 includes a metal roller shaft coated with a roller made from an ion-conductive rubber material. During the transfer process, the high-voltage power source circuit board 95 applies a transfer bias to the transfer roller 30. The transfer bias generates a potential difference between the surfaces of the photosensitive drum 27 and the transfer roller 30. The potential difference electrically attracts toner that has been electrostatically clinging to the surface of the photosensitive drum 27 toward the surface of the transfer roller 30.

The fixing device 18 in the image forming section 5 is disposed downstream from the process cartridge 17 with respect to the direction of sheet transport. The fixing device 18 includes a fixing roller 41, and a pressure roller 42 for pressing the fixing roller 41. The fixing roller 41 is formed by coating a hollow aluminum tube with a fluorocarbon resin and sintering the assembly. The fixing roller 41 includes a halogen lamp 41a for heating inside the metal tube. The pressure roller 42 includes a silicon rubber shaft having low hardness, and a tubular member covering the rubber shaft and formed of a fluorine resin. The silicone rubber shaft is urged upward by a spring (not shown), pressing the pressure roller 42 against the fixing roller 41. While the sheet 3 from the process cartridge 17 passes between the fixing roller 41 and the pressure roller 42, the fixing roller 41 pressurizes and heats a toner image that has been transferred onto the sheet 3 in the process cartridge 17, thereby fixing the toner onto the sheet 3. Afterward, the sheet 3 is transported to a sheet discharge path 44.

The sheet discharge tray 46 is formed at an upper central and relatively frontward portion of the main body 2 in a form of a recess. A bottom of the sheet discharge tray 46 is inclined upwardly toward the front side of the main body 2 and is bent so that the inclination is reduced toward the front side of the main body 2. The printed sheets 3 can be discharged onto the bottom of the sheet discharge tray 46 in a stacked manner.

The electrical configuration of the laser printer 1 will be described below with reference to FIGS. 2 to 4.

Figure 2:
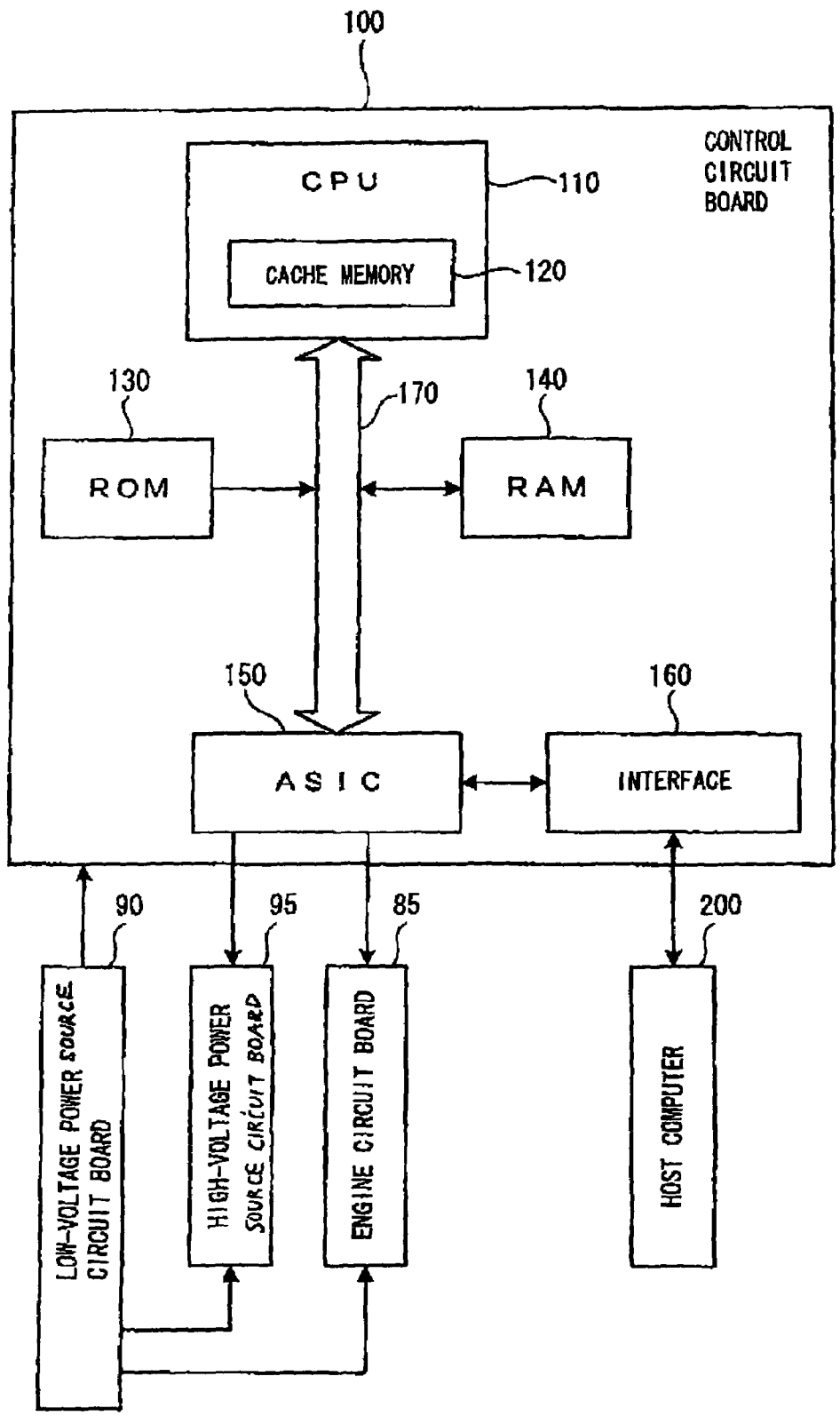
FIG. 2 is a block diagram of the electrical configuration of the laser printer of FIG. 1.

As shown in FIG. 2, a CPU 110, a ROM 130, a RAM 140, an application specific integrated circuit (ASIC) 150, and an interface circuit 160 are provided on the control circuit board 100.

The ROM 130, the RAM 140, and the ASIC 150 are connected to the CPU 110 via a data bus 170. The interface circuit 160 is connected to the ASIC 150. The CPU 110 performs the main control of the laser printer 1 by executing various programs stored in the ROM 130, by temporarily storing data in the RAM 140 while executing the programs, and by transferring through the ASIC 150 commands and the like for controlling various devices. A cache memory 120 is provided in the CPU 110 to buffer a difference between the data processing speed of the CPU 110 and the data processing speed of the RAM 140, to thereby increase the overall speed. Note that an ASIC is a custom IC that is configured from various basic circuits so as to conform to a specific usage objective. In this way, the essential components of the control circuitry for the laser printer 1 are mounted on a single chip ASIC.

The high-voltage power source circuit board 95 and the engine circuit board 85 are connected to the ASIC 150. The bias generated by the high-voltage power source circuit board 95 is applied to components, such as the scorotron charger 29, the developer roller 31, the transfer roller 30, and other components in the process cartridge 17. The drive motor (not shown in the figure) that is connected to the engine circuit board 85 applies a driving force to the photosensitive drum 27, the developer roller 31, the transfer roller 30, and also to the feed rollers and other components, through a drive system (not shown in the figure), to drive the various rollers to rotate. Note that the drive system is configured of gears and other components to distribute and transmit the driving force that is output from the drive motor.

The low-voltage power source circuit board 90 is connected to the control circuit board 100, the high-voltage power source circuit board 95, and the engine circuit board 85, and supplies electrical power thereto. A host computer 200 is connected to the interface circuit 160 of the control circuit board 100 by means of a USB cable or the like, so that print commands and the like are sent to the laser printer 1.

Figure 3:
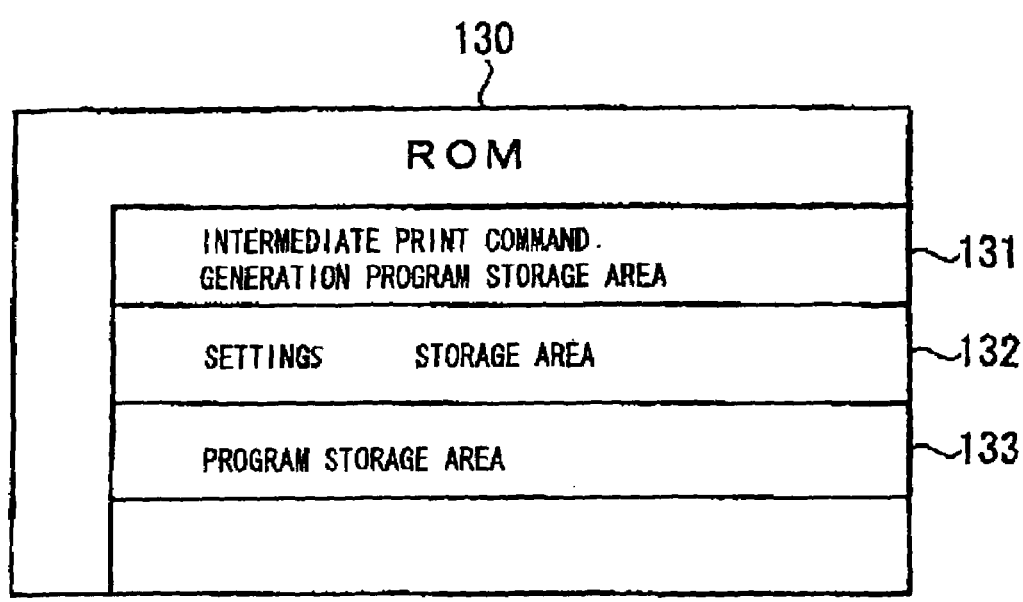
FIG. 3 illustrates the configuration of storage areas in a ROM shown in FIG. 2.
Figure 9:
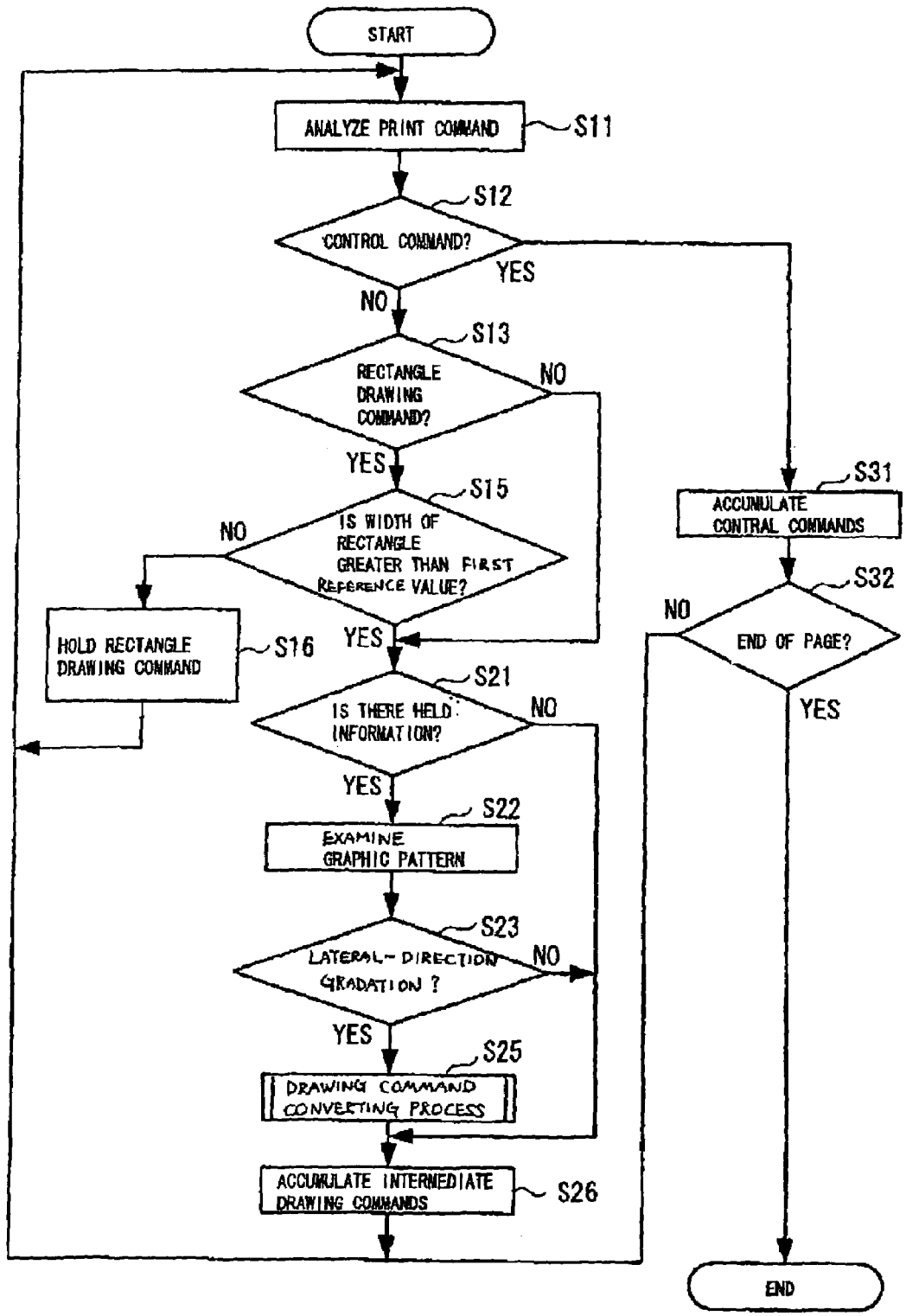
FIG. 9($a$) is a flowchart of an intermediate print command generation process executed by an intermediate print command generation program.
Figure 9B:
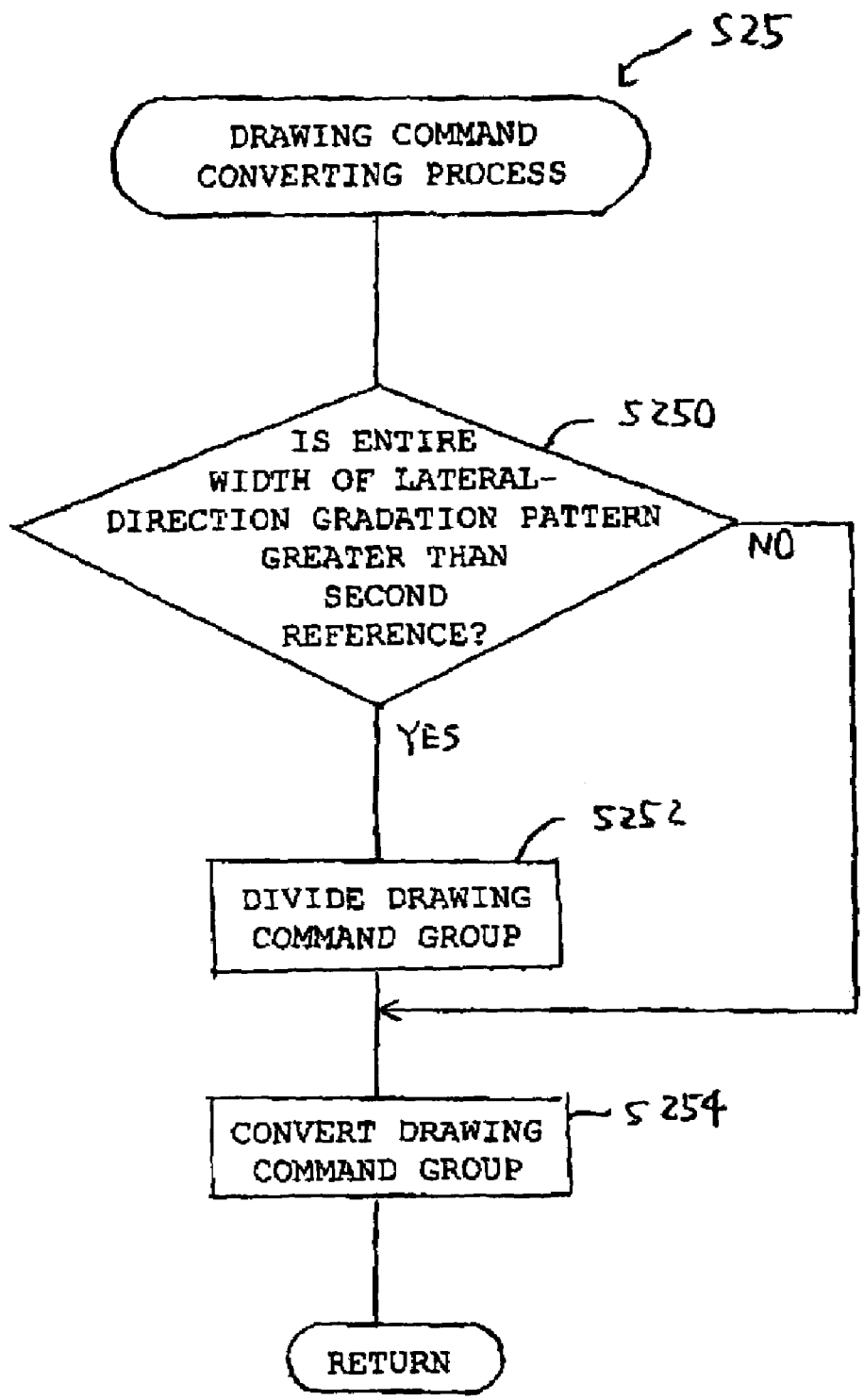

As shown in FIG. 3, the ROM 130 is provided with: an intermediate print command generation program storage area 131 which is prestored with an intermediate print command generation program (FIGS. 9(a) and 9(b)); a settings storage area 132 which is prestored with values, including a predetermined first reference value, a predetermined second reference value, and various predetermined initial values; and a program storage area 133 which is prestored with other programs such as a control program for controlling the laser printer 1 and a known PDL interpreter. As will be described later, the first reference value is equal to about a half of the length of one record of the cache memory 120. The second reference value is equal to about the length of one record of the cache memory 120.

Figure 4:
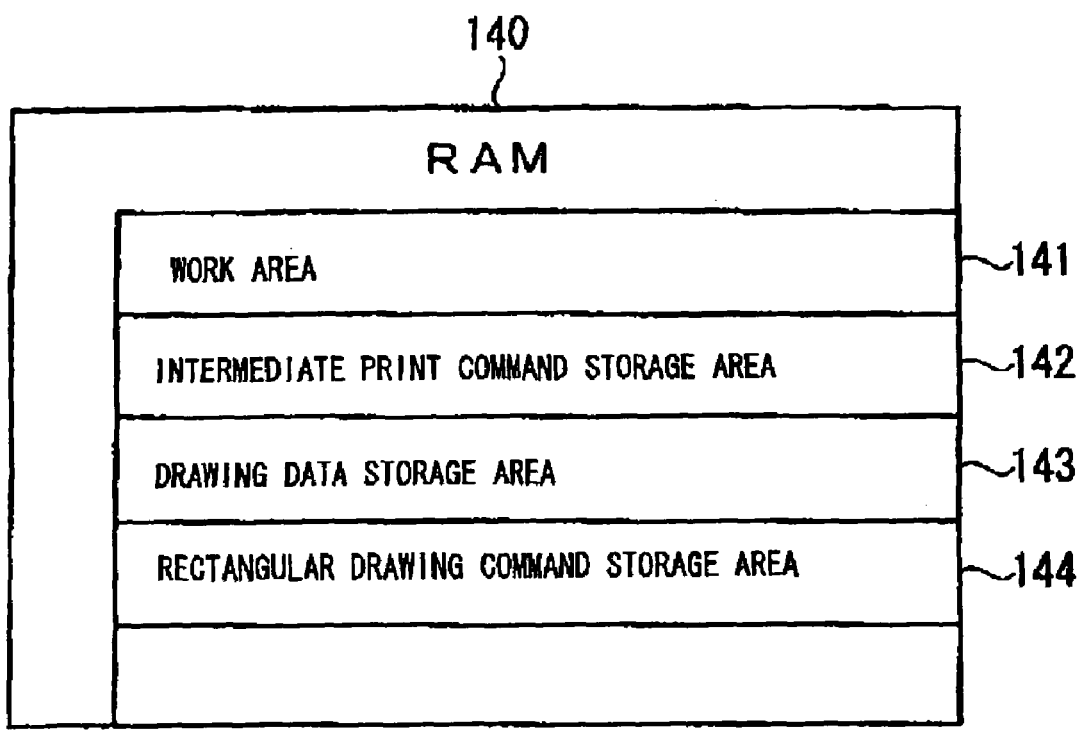
FIG. 4 illustrates the configuration of storage areas in a RAM shown in FIG. 2.

As shown in FIG. 4, the RAM 140 is provided with: a work area 141 for temporarily storing therein various data while the CPU 110 executes the programs; an intermediate print command storage area 142 for storing therein control commands and drawing commands which the CPU 110 processes while executing the intermediate print command generation program; a drawing data storage area 143, on which a virtual page is defined to develop and store drawing data (virtual-image data in bitmap form) thereon; and a rectangular drawing command storage area 144 for temporarily storing therein a drawing command for drawing a rectangular pattern whose width is smaller than or equal to the first reference value.

Next will be described with reference to FIGS. 1 and 2 how the laser printer 1 operates during printing.

Upon receiving print commands from the host computer 200, the laser printer 1 executes an image forming process 370 (FIG. 7) based on drawing data that has been generated based on the print commands by an image processing that will be described later.

In the image forming process 370 (FIG. 7), when the CPU 110 generates drawing data for printing and outputs a print start signal, a paper 3 is fed by the paper supply roller 8 to the resist rollers 12. The resist rollers 12 resist or retard the paper 3, before sending the paper 3 out at a timing at which the leading edge of the visible image formed on the surface of the rotating light-sensitive drum 27 aligns with the leading edge of the paper 3.

In the scanner unit 16, the laser-emitting section (not shown in the figure) generates a laser beam based on a laser drive signal, which is generated by the engine circuit board 85 based on the drawing data. The laser beam is emitted towards the polygon mirror 19. The polygon mirror 19 scans the incident laser beam in a main scanning direction (the direction perpendicular to the feed direction of the paper 3), to emit the laser beam towards the fθ lens 20. The fθ lens 20 converts the laser beam, that has been scanned by the polygon mirror 19 at an equiangular velocity, into a scan of a uniform linear speed. The laser beam is converted in its direction of propagation by the reflective mirror 21a, is focused by the cylindrical lens 22, and is imaged onto the surface of the light-sensitive drum 27 by the reflective mirror 21b.

The scorotron charger 29, to which an electrostatic bias is applied by the high-voltage power source circuit board 95, electrically charges the photosensitive drum 27 so that the surface potential thereof becomes approximately 1,000 V. After being electrically charged, the photosensitive drum 27, which rotates in the direction of the arrow (clockwise in FIG. 1), receives the irradiation of the laser beam. The laser beam emitted from the scanner unit 16 is scanned along the main scan lines of the paper 3 in such a manner that the laser beam is irradiated onto portions that are to be developed but is not irradiated onto portions that are not to be developed, with the surface potential of portions that receive the irradiation of the laser beam (light portions) being reduced to approximately 200 V. As the photosensitive drum 27 rotates, the laser beam is scanned also in the auxiliary scanning direction (the feed direction of the paper 3) so that an invisible electrical image, in other words, a electrostatic latent image, is formed on the surface of the photosensitive drum 27 by the light portions and portions on which the laser beam has not been irradiated (dark portions).

In this case, toner that is supplied by the toner hopper 34 and that has been charged positively by friction between the supply roller 33 and the developer roller 31 is carried by the developer roller 31 to a thickness that is controlled to be a constant thin layer. A positive developing bias of approximately 400 V is applied by the high-voltage power source circuit board 95 to this developer roller 31. When the toner that is carried on the developer roller 31 and that is also given a positive charge comes into contact with the photosensitive drum 27 by the rotation of the developer roller 31, the toner transfers to the electrostatic latent image formed on the surface of the photosensitive drum 27. In other words, since the potential of the developer roller 31 is lower than the potential of the dark portions (+1000 V) but higher than that of the light portions (+200 V), the toner transfers selectively to the low-potential light portions. Thus a visible image is formed as an image developed by the toner.

While the paper 3 passes between the photosensitive drum 27 and the transfer roller 30, the transfer-forward bias, which is a negative constant current of approximately −1,000 V that is even lower than the potential of the light portions (+200 V), is applied to the transfer roller 30 and the visible image that has been formed on the surface of the photosensitive drum 27 is transferred to the paper 3.

The paper 3 onto which the toner has been transferred is sent on to the fixing unit 18. The fixing unit 18 applies heat at approximately 200° C. by the fixing roller 41 and pressure by the pressure roller 42 to the paper 3 carrying the toner, to cause the toner on the paper 3 to melt, to form a permanent image. Note that each of the fixing roller 41 and the pressure roller 42 is grounded via a diode, with the configuration being such that the surface potential of the pressure roller 42 is lower than that of the fixing roller 41. The positively charged toner on the fixing roller 41 side of the paper 3 is electrically attracted toward the pressure roller 42 through the paper 3. It is possible to prevent disruption of the image by preventing the toner from being attracted by the fixing roller 41 during the fixing.

The paper 3 onto which the toner has been fixed by heat and pressure is fed along the paper discharge path 44 and is output into the paper discharge tray 46 with the printed surface downward. The next sheet of paper 3 to be printed is stacked with the printed surface downward on top of the previously output sheet in the paper discharge tray 46, in a similar manner. This enables sheets of paper 3 to be mounted one on another in the order the sheets 3 have been printed.

Note that a process known as a cleanerless developer method is employed in this laser printer 1, whereby, after the toner has been transferred by the transfer roller 30 from the light-sensitive drum 27 to the paper 3, any toner remaining on the surface of the light-sensitive drum 27 is recovered by the developer roller 31.

In laser printers that are Generally used, printing is performed in manuscript page units. To print a document created by an application program or the like that is running on a host computer, according to one method, print data is converted into drawing data on the host computer side before being sent to a laser printer, and printing is performed on the laser printer on the basis of the drawing data. According to another method, print commands are generated by the host computer and are sent to the laser printer, and the print commands are converted into drawing data on the laser printer side.

In the latter case, commands written in a page description language (PDL) such as Postscript (registered trademark), for example, which has been developed by Adobe Systems, are included within the print commands. A page description language specifies the sizes, positions, and other details of individual fonts, graphics, and images to be created on the page. The page description language is often written in a text format. Drawing commands for drawing individual fonts, graphic patterns, and images (including some fonts) according to a page description language are sent from the host computer to the laser printer together with control commands (commands for declaring definitions of information such as the leading and trailing edges of the paper, size, and resolution). The drawing commands and the control commands are sent from the host computer to the laser printer as print commands. In other words, print commands defined in the page description language are made from a string of control commands and drawing commands. These commands are executed by the laser printer in the sequence they are written in the laser printer. By setting one page of a virtual manuscript (hereinafter called a "virtual page") on a storage area in a memory device and by drawing a virtual image according to the drawing commands, drawing data is created in the storage area. The laser printer forms an actual image based on the drawing data.

Note that the drawing commands include: drawing commands for drawing graphic patterns which are formed from components such as rectangles, circles, and Bezier curves; drawing commands for drawing fonts as graphic patterns by using vector data; and drawing commands for drawing images and some fonts as bitmap images. The document or the like that is originally created by the application program is configured by overlapping fonts, graphics, and images that are drawn based on the drawing commands.

Figure 7:
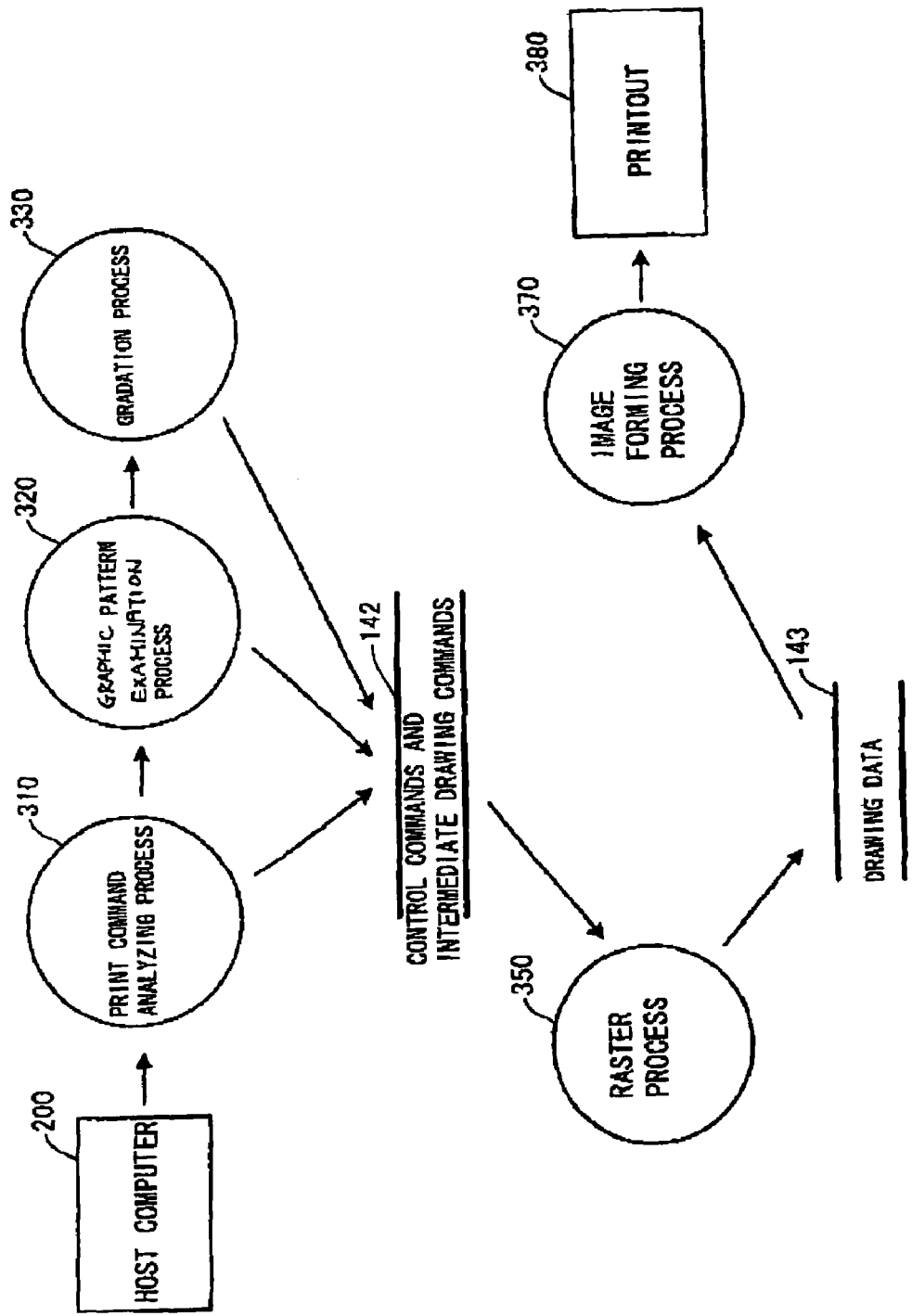
FIG. 7 is a data flow diagram showing the flow of data in the laser printer.

In the laser printer 1 of the present embodiment, an image processing is executed prior to the image forming process 370 (FIG. 7). In the image processing process, if some drawing command group that is defined in the page description language is determined to satisfy a predetermined condition, the drawing command group is converted into a secondary drawing command, and the thus produced secondary drawing command is set as an intermediate drawing command. Drawing data is generated based on the intermediate drawing command. This is because, for the drawing command group that satisfies the predetermined condition, it might be possible to improve the processing speed by converting the drawing command group into the secondary drawing command and then by generating drawing data based on the secondary drawing command, rather than generating drawing data directly from the original drawing command group. An example of such a drawing command group that satisfies the predetermined condition is a drawing command group that draws a lateral-direction gradation pattern (array pattern) whose color tone (color and/or tone) varies in the lateral direction of the page, in other words, in the main scanning direction.

Figure 5:
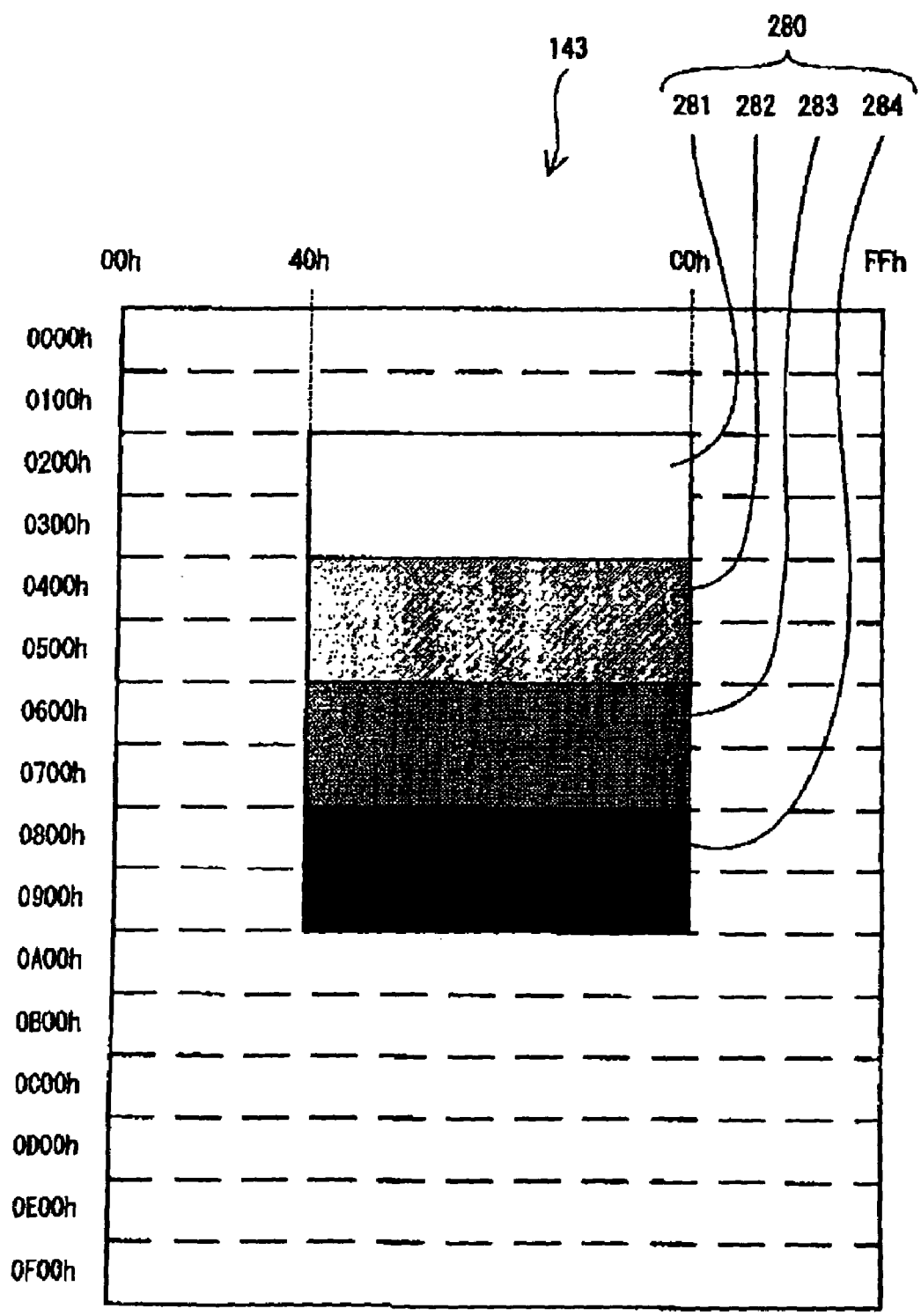
FIG. 5 illustrates a state of a drawing data storage area serving as a virtual page, on which a longitudinal-direction gradation pattern whose color tone varies in an auxiliary scanning direction (longitudinal direction) is drawn.

Assume, by way of example, as shown in FIG. 5, that a virtual page is set on the drawing data storage area 143 of the RAM 140, that the virtual page is configured to have a size of 16 dots high and 16 dots wide, and that two bytes (16 bits) of storage capacity are required for representing a color tone of each dot. In such a case, the drawing data storage area 143 is required to have a storage capacity of 4,096 bits for generating drawing data for the entire virtual page. The drawing data storage area 143 is divided into a plurality of consecutive segments (lines) along a longitudinal direction (the auxiliary scanning direction) of the virtual page. In each line, respective storage portions, each for storing one bit, are arranged along a lateral direction (main scanning direction) of the virtual page. The main scanning direction and the auxiliary scanning direction extend substantially perpendicularly with each other. Addresses are allocated to the respective bits in the drawing data storage area 143 so that addresses 0000h to 0FFFh are allocated to the entire virtual page, with the top left dot of the virtual page having address 0000h, and the sixteenth dot from the top left dot in the lateral direction having address 00FFh. The first through the 16-th dots are allocated as the first line. Similarly, addresses 0100h to 01FFh are allocated as the second line. Addresses are allocated in the same manner as described above in the third through fifteenth lines, and addresses 0F00h to 0FFFH are allocated for the sixteenth line.

Note that the configuration of the virtual page is not necessarily limited to the size of 16 dots high by 16 dots wide, and the storage capacity is also not limited to two bytes per dot.

A longitudinal-direction gradation pattern 280 has a color tone that varies in the longitudinal direction (auxiliary scanning direction). The longitudinal-direction gradation pattern 280 is represented by disposing four rectangles 281, 282, 283, and 284 consecutively in the longitudinal direction. The rectangle 261 is drawn by a drawing command that fills a rectangle having vertices at addresses 0240h, 02BFh, 0340h, and 03BFh with a first color.

Similarly, the rectangle 282 is drawn by a drawing command that fills a rectangle having vertices at addresses 0440h, 04BFh, 0540h, and 05BFh with a second color. The rectangles 283 and 284 are drawn in a similar manner, and filled with third and fourth colors, respectively.

If the drawing command group that draws these rectangles 281 to 284 is executed in sequence, the rectangle 281 is first drawn as a virtual-image on the virtual page by filling the 16-dot area from address 0240h with the first color and then by filling the 16-dot area from address 0340h with the first color. The rectangle 282 is then drawn by filling the 16-dot area from address 0440h with the second color and then by filling the 16-dot area from address 0540h with the second color. By subsequently drawing the rectangles 283 and 284 in a similar manner as described above, the longitudinal-direction gradation pattern 280 is finally obtained in the virtual page.

Figure 6:
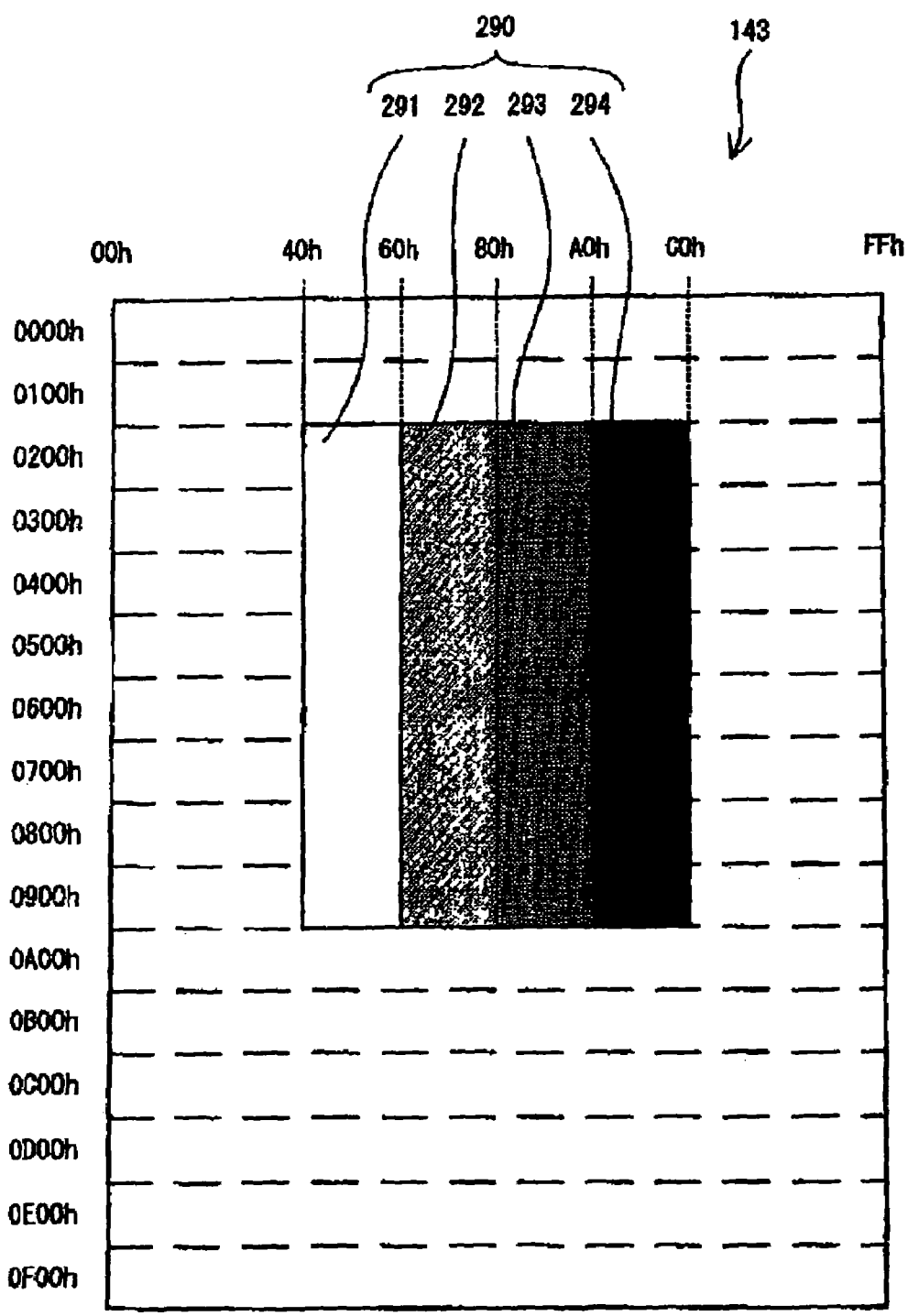
FIG. 6 illustrates another state of the drawing data storage area, on which a lateral-direction gradation pattern whose color tone varies in a main scanning direction (lateral direction) is drawn.

FIG. 6 shows a lateral-direction gradation pattern 290 whose color tone varies in the lateral direction (main scanning direction). The lateral-direction gradation pattern 290 is represented by disposing four rectangles 291, 292, 293, and 294 consecutively in the lateral direction. The rectangle 291 is drawn by a drawing command that fills a rectangle having vertices at addresses 0240h, 025Fh, 0940h, and 095Fh with a first color. Similarly, the rectangle 292 is drawn by a drawing command that fills a rectangle having vertices at addresses 0260h, 027Fh, 0960h, and 097Fh with a second color. The rectangles 293 and 294 are drawn in a similar manner, and filled with third and fourth colors.

If the drawing command group that draws these rectangles 291 to 294 is executed in sequence, the rectangle 291 is first drawn as a virtual-image on the virtual page by filling the two-dot area from address 0240h with the first color, filling the two-dot area from address 0340h with the first color, and continuing on in this manner until the final two-dot area from address 0940h is filled with the first color. The rectangle 292 is then drawn by filling the two-dot area from address 0260h with the second color then continuing on in a similar manner to the rectangle 291 until the final two-dot area from address 0960h is filled with the second color. The rectangles 293 and 294 are drawn in a similar manner. This draws the lateral-direction gradation pattern 290 on the virtual page.

The drawing of the lateral-direction gradation pattern 290 often leads to a reduction in the processing speed of the drawing process. This is because a larger number of storage addresses have to be specified for the lateral-direction gradation pattern 290 than for the longitudinal-direction gradation pattern 280, and therefore the drawing efficiency for the lateral-direction gradation pattern 290 is lower than that for the longitudinal-direction gradation pattern 280. For that reason, the lateral-direction gradation pattern 290 can be converted into a more efficient secondary drawing command that draws the same gradation line from addresses 0240h, 0340h, 0440h, . . . , and 0840h, respectively, by drawing, for each gradation line, "first color, first color, second color, second color, third color, third color, fourth color, fourth color" in one-dot units in the main scanning direction. In other words, the lateral-direction gradation pattern 290 can be converted into the more-efficient secondary drawing command that repeatedly draws in the auxiliary scanning direction the same gradation line that extends in the main scanning direction and that is formed by drawing first color, first color, second color, second color, third color, third color, fourth color, fourth color in one-dot units in succession in the main scanning direction and therefore that has color tone (color and/or tone) varying in the main scanning direction.

However, even if the drawing command group that draws a lateral-direction gradation pattern is converted into secondary drawing commands that are more efficient, as described above, the processing speed could still possibly fall depending on how drawing data is handled while being created based on the secondary drawing commands. This embodiment efficiently improves the processing speed by investigating the efficiency of data transfer between the RAM 140 and the cache memory 120 as will be described later.

Next will be described with reference to FIG. 7 how print commands outputted from the host computer 200 are converted into drawing data through the image processing, and the drawing data is printed onto a paper 3.

Note that in the data flow diagram of FIG. 7, each data flow is indicated by an arrow, each data process is indicated by a circle, data in an accumulated state (data store) is indicated by double bold lines, and each data generation source or destination (outside of the laser printer 1) is indicated by a box.

As shown in FIG. 7, the user controls the host computer 200 to execute an application program to create print data for a document or the like and to send the print data to the laser printer 1 as print commands written in a page description language. Each command making up the print commands is inputted to the laser printer 1 through the interface circuit 160 (see FIG. 2), and is analyzed by a print command analyzing process 310. The print command analyzing process 310 uses the known PDL interpreter (a program that interprets and executes commands written in page description language, one command at a time) for the analyzing process. Note that the print command analyzing process 310 simply determines what each command is to do, but does not actually execute the subject command. Sequentially-inputted control commands are stored in the order, in which the control commands are inputted to the laser printer 1, in the intermediate print command storage area 142 of the RAM 140.

Of the drawing commands, drawing commands for drawing graphics other than rectangles, drawing commands for drawing fonts, and drawing commands for drawing images are stored without change in the order, in which the drawing commands have been inputted in the laser printer 1, in the intermediate print command storage area 142, as intermediate drawing commands, in a similar way as the control commands.

On the other hand, one or more successive rectangle drawing command for drawing one or more successive rectangle is processed by a graphic pattern examination process 320. In this graphic pattern examination process 320, it is determined whether or not the one or more successive rectangle drawing command is for drawing a lateral-direction gradation pattern as shown in FIG. 6, for example. If the one or more successive rectangle drawing command is not for drawing a lateral-direction gradation pattern, the one or more successive rectangle drawing command is stored as unchanged as one or more intermediate drawing command in the intermediate print command storage area 142, in a similar way as described above.

On the other hand, if one or more successive rectangle drawing command is for drawing a lateral-direction gradation pattern, the rectangle drawing command is processed by a gradation process 330. In other words, the rectangle drawing command is converted into more efficient, secondary drawing commands that draw the lateral-direction gradation pattern by repeatedly drawing in the auxiliary direction the same gradation line that extends in the main scanning direction. The resultant secondary drawing commands are stored in the intermediate print command storage area 142 as intermediate drawing commands.

When the analysis of all the drawing commands included within the print commands is completed, the control commands and drawing commands that are collected as intermediate drawing commands are subjected to a raster process 350. In other words, the control commands and intermediate drawing commands stored in the intermediate print command storage area 142 are executed by the PDL interpreter in the order in which the commands have been collected, to thereby generate drawing data on the virtual page that is set on the drawing data storage area 143. Then, the image forming process 370 forms an actual image as a toner image on a paper 3 based on the drawing data. Thus the user can obtain, as a printout 380, a sheet of paper 3 on which the image is actually formed. Thus, the CPU 110 executes the raster process 350 to generate drawing data.

In this manner, the laser printer 1 converts drawing commands included within the received print commands into intermediate drawing commands, generates drawing data based on the intermediate drawing commands, and then finally forms an image based on the drawing data. It is possible to increase the image processing speed by increasing data transfer efficiency between the RAM 140 and the cache memory 120 by reducing the number of times that the storage content of the cache memory 120 is overwritten and increasing the hit efficiency of the cache accordingly.

Next will be described operation of the cache memory 120.

The cache memory 120 is a storage device that is designed to increase speeds by buffering a difference between the data processing speed of the CPU 110 and that of the RAM 140. The RAM 140 employs, as a storage element, a dynamic random-access memory (DRAM), which utilizes the presence or absence of charges in its internal capacitors. The cache memory 120 employs, as a storage element, a static RAM (SRAM), which stores data by utilizing the operating state of a circuit including transistors. Accordingly, the cache memory 120 can read and write data more rapidly than the RAM 140.

Additionally, the cache memory 120 has a much smaller storage capacity than the RAM 140. There is a limited range of addresses in the storage area of the cache memory 120 in which the CPU 110 stores data while processing the same. The amount of data required for specifying the addresses in the cache memory 120 is small, which enables a further increase in the speed of reading and writing data from and to the cache memory 120.

The thus-configured cache memory 120 enables an increase in the speed of processing of the CPU 110 by ensuring that, when the CPU 110 reads data that is stored in the RAM 140 to process the data, the read-out data is stored in the cache memory 120 at the same time when the data is being processed, so that the same data can be used in the next process by simply reading the data from the cache memory 120.

Figure 8:
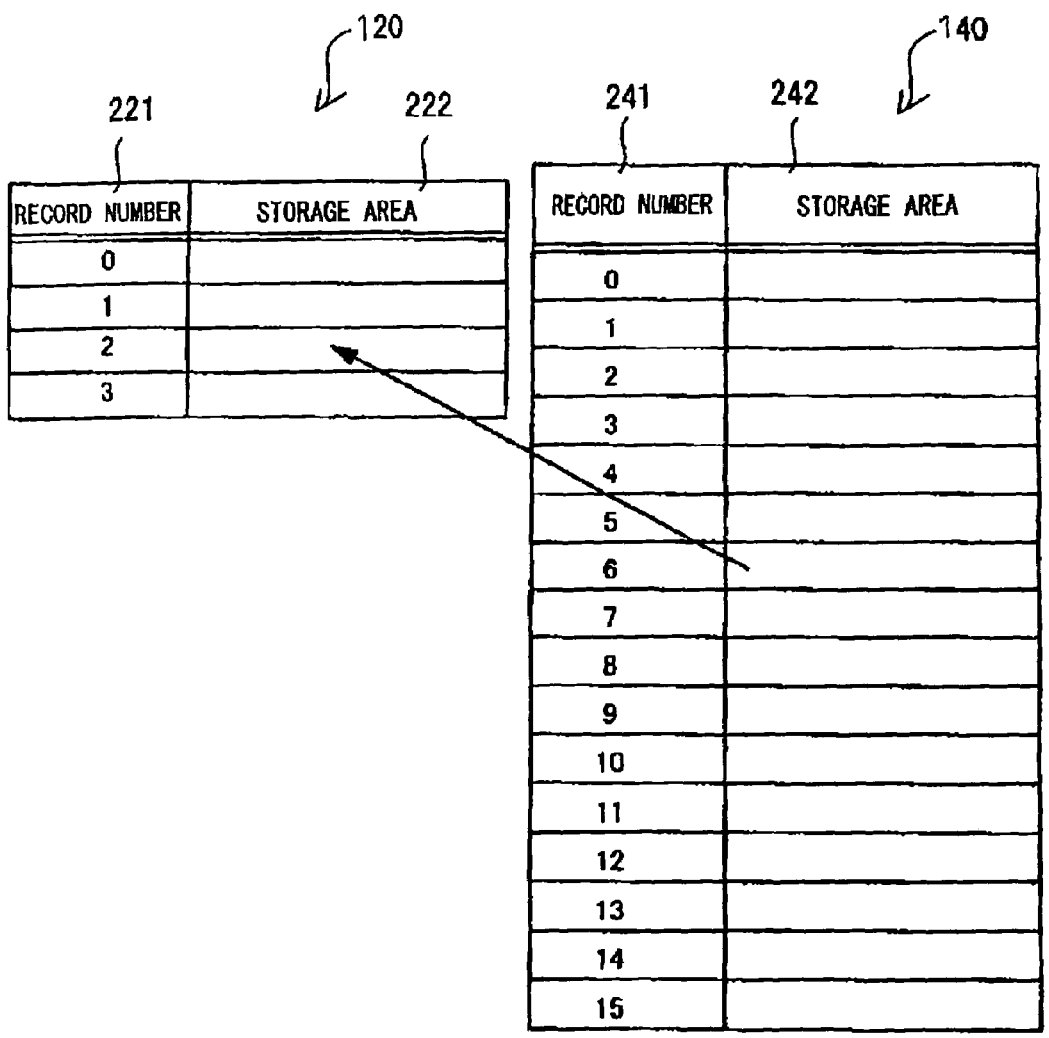
FIG. 8 illustrates the storage areas in a cache memory and the RAM.

FIG. 8 shows an example of the correspondence between data stored in the cache memory 120 and data stored in the RAM 140. The entire storage area in the RAM 140 is divided into a plurality of (sixteen, in this example) records 242, and the entire storage area in the cache memory 120 is divided also into several (four, in this example) records 222. Each record 242 is made from several storage portions which are arranged adjacent to one another in the RAM 140. Each record 222 is made from several storage portions which are arranged adjacent to one another in the cache memory 120. Each record 222 has a storage capacity that is equal to the storage capacity of each record 242. The RAM 140 is linked to the cache 120 by record units. There are many ways of linking the records 242 and 222 in the two memories, but the configuration in FIG. 8 is of a direct mapping method according to one example.

In this example, the four records 222 are allocated with record numbers 221 from 0 to 3. Similarly, the sixteen records 242 are allocated with record numbers 241 from 0 to 15.

When the CPU 110 reads, from the RAM 140, data to be used in processing, the CPU 110 copies the contents of a record 242, in which the subject data is stored, into a corresponding record 222 in the cache memory 120, while linking the record number 241 of the record 242 to the record number 221 of the record 222 so that the record number 221 is equal to a remainder obtained by dividing the record number 241 by the total number of the records 222 in the cache memory 120. For example, in order to use data stored in a record 242 with the record number 241 of six (6) for processing, the CPU 110 copies the entire contents of the record 242 with the record number 241 of six (6) to the record 222 with the record number 221 of two (2). When the CPU 110 uses the same data in the next process, if the subject data remains unchanged in the cache memory 120 without being overwritten by other data, the CPU 110 will refer to the record 222 with the record number 221 of two (2) with more priority than to the record 242 with the record number 241 of six (6). This enables an improvement in the data processing speed by the CPU 110.

It is now assumed that the storage capacity for one record in the cache memory 120 (hereinafter called "one record length") is 32 bytes and that the CPU 110 generates drawing data that requires a data capacity of one byte per pixel. It is further assumed a case where each of two or more successive rectangles constituting a lateral-direction gradation pattern has five pixels' worth of width in the lateral direction. In this case, by transferring data of one record between the cache memory 120 and the RAM 140, the CPU 110 can transfer data of one lateral-direction line that extends over six successive rectangles (equivalent to 30 bytes) and therefore that constitutes the six successive rectangles within the lateral-direction gradation pattern. This results in a transfer loss of two bytes. On the other hand, it is assumed another case where each rectangle has seventeen pixels' worth of width. In this case, by transferring data of one record between the cache memory 120 and the RAM 140, the CPU 110 can transfer data of one lateral-direction line that extends only over one rectangle (equivalent to seventeen bytes) and therefore that constitutes the one rectangle within the lateral-direction gradation pattern. This results in a transfer loss of fifteen bytes.

For that reason, if drawing data for drawing one line in one rectangle has a data amount that is greater than or equal to a half the length of one record, it is preferable not to convert the original drawing command into a secondary drawing command in order to prevent a paradoxical fall in the processing speed.

Next will be described, with reference to the flowcharts of FIGS. 9(a) and 9(b), the sequence how to generate intermediate drawing commands while considering the hit rate of the cache 120.

Note that the intermediate print command generation program, illustrated in the flowcharts of FIGS. 9(a) and 9(b), is stored in the intermediate print command generation program storage area 131 of the ROM 130.

A control program (not shown in the figures) for the laser printer 1 is read out from the program storage area 133 when the laser printer 1 is started being executed. When print commands are received during the execution of the control program, the intermediate print command generation program is called, read into the work area 141 of the RAM 140, and is executed. The CPU 110 executes the intermediate print command generation program to perform an image processing. Each step in the flowchart is denoted by "S" in the description below.

When the intermediate print command generation program is started being executed, first in S11, the CPU 110 analyzes, one at a time, control commands and drawing commands that constitute the received print commands (print command analyzing process 310 in FIG. 7). For each command that has been analyzed by the PDL interpreter, the CPU 110 executes the print command analyzing process 310 to confirm whether or not the analyzed command is a control command in S12, and to confirm whether or not the analyzed command is a drawing command for drawing a rectangle in S13.

If a command analyzed by the PDL interpreter is a control command (YES in S12), the control command is stored and accumulated in the intermediate print command storage area 142 (FIG. 4) in S31.

If the control command is not a page end control command indicative of the trailing end of the manuscript page (NO in S32), the flow returns to S11 and the next command is analyzed.

On the other hand, if a command analyzed by the PDL interpreter is a drawing command (NO in S12), the CPU 110 confirms whether or not the drawing command is for drawing a rectangle (S13). If the drawing command is for drawing a rectangle (YES in S13), the CPU 110 confirms in S15 whether or not the width in the main scanning direction (the lateral direction of the virtual page) of a rectangle to be drawn by the drawing command is greater than the first reference value.

There are various methods for drawing a rectangle. One example is a method of specifying the coordinates (in a coordinate system in which the top left of the virtual page is (0, 0), the x axis extends in the lateral direction, and the y axis extends in the longitudinal direction) of four vertices and specifying a color to fill the region that is bounded by straight lines linking the four vertices. In such a case, the width of the rectangle can be determined based on the coordinates of the vertices. Based on the width of the rectangle, the number of dots (drawing data) required to draw the entire width of the rectangle in a bitmap form is determined. It is determined how many bits of storage capacity are required to draw all the dots over the entire width of the rectangle on the virtual page. In other words, the amount of data required to draw the entire width of the rectangle is determined.

The first reference value is determined previously dependently on the length of one record in the cache memory 120. A drawing command group that draws a plurality of rectangles to form a lateral-direction gradation pattern is converted into a secondary drawing command that repeatedly draws in the auxiliary scanning direction a virtual-line-image (lateral-direction gradation line) which constitutes the lateral-direction gradation pattern and whose color tone varies in the main scanning direction.

The width of the lateral-direction gradation pattern indicates the amount of data required to draw the lateral-direction gradation line. If the width of the lateral-direction gradation pattern is less than or equal to the length of one record of the cache memory 120, the record in the cache memory 120, in which data of the lateral-direction gradation line is stored, can be repeatedly used without being overwritten while the lateral-direction gradation pattern is being drawn. The hit rate of the cache can be increased, making it possible to improve the speed at which the gradation pattern is drawn.

The width of one rectangle indicates the amount of data required to draw the entire width of the subject rectangle. In other words, the width of one rectangle indicates the amount of data required to draw a lateral-direction line (widthwise line) that constitutes the subject rectangle and that extends in the main scanning direction. If the width of one rectangle is greater than the length of one record of the cache memory 120, overwriting of the cache memory 120 will become frequent, leading to a drop in the drawing speed. Accordingly, the amount of data drawing the width of each rectangle is required to be smaller than the length of one record.

It is noted that even if the amount of data required for drawing the width of each rectangle is smaller than the length of one record, if the data amount is substantially the same as the length of one record, converting the rectangle drawing command into a secondary drawing command for repeatedly drawing the widthwise line (lateral-direction line) of the rectangle will lead to a drop in the drawing speed due to the addition of the time taken to convert the drawing command. For that reason, it is preferable to set the size of the first reference value to about a half of the length of one record of the cache memory 120. Note that the first reference value need not necessarily be one-half of the length on one record, but may be any data capacity that is smaller than one record, such as one-third or one-quarter of one record.

If the width of the rectangle to be drawn is less than or equal to the first reference value (NO in S15), the drawing command for the rectangle is stored in the rectangular drawing command storage area 144 to be temporarily held therein in S16. The flow returns to S11 and the next command is analyzed.

Drawing commands for drawing the rectangles that constitute the lateral-direction gradation pattern are usually written consecutively in a page description language. If the next drawing command analyzed is for drawing another rectangle and the width of the other rectangle is less than the first reference value, the drawing command is accumulated in a similar manner as described above in succession to the already-stored rectangle drawing command (YES in S13, NO in S15, and S16).

On the other hand, if the next drawing command that is analyzed is not a rectangle drawing command (NO in S13), the flow proceeds to S21.

Similarly, if the width of the rectangle is greater than the first reference value (YES in S15), it is known that it will be impossible to improve the drawing speed, so the flow proceeds to S21.

The CPU 110 determines in S21 whether or not some information is held in the rectangular drawing command storage area 144, in other words, whether or not some rectangle drawing command is stored in the rectangular drawing command storage area 144.

If some rectangle drawing command is held in the rectangular drawing command storage area 144 (YES in S21), the CPU 110 examines in S22 a graphic to be drawn by the rectangular drawing command. In other words, the CPU 110 executes the graphic pattern examination process 320 (see FIG. 7) to confirm whether or not a lateral-direction gradation pattern will be created by the rectangle drawing command presently stored in the rectangular drawing command storage area 144.

In S22, the CPU 110 executes the graphic pattern examination process 320 (FIG. 7) based on the coordinates of the vertices of a rectangle that is to be drawn by each rectangle drawing command.

In S23, the CPU 110 judges whether or not two or more successive rectangle drawing commands (which will be referred to as "rectangle drawing command group" hereinafter) are presently stored in the rectangular drawing command storage area 144, whether or not two or more rectangles to be drawn by the rectangle drawing command group are arranged in succession in the main scanning direction, and whether the heights (the lengths along the auxiliary scanning direction) of the rectangles are equal to one another. If two or more successive rectangle drawing commands are presently stored in the rectangular drawing command storage area 144 and if the two or more successive rectangle drawing commands are for successively arranging in the main scanning direction two or more rectangles with their heights being all the same, the CPU 110 determines that the rectangle drawing command group is assumed to form a lateral-direction gradation pattern (YES in S23). In such a case, the CPU 110 executes a gradation process 330 (FIG. 7) in S25 to convert the rectangle drawing command group into a secondary drawing command that repeatedly draws a lateral-direction gradation line in the auxiliary scanning direction.

The thus obtained secondary drawing command is then stored and accumulated in S26 in the intermediate print command storage area 142 as an intermediate drawing command.

Note that a drawing command that has been analyzed directly after the rectangle drawing command group and that has caused the process in S25 to be executed for the rectangle drawing command group by making the judgment of S13 negative or by making the judgment of S15 positive is accumulated in S26 without change as an intermediate drawing command.

It is noted that the second reference value is previously determined to have a value equal to the length of one record of the cache memory 120, and is prestored in the settings storage area 132.

It is also noted that the entire width of the lateral-direction gradation pattern to be drawn by the rectangle drawing command group may possibly be smaller than, equal to, or greater than the first reference value. When the entire width of the lateral-direction gradation pattern is greater than the first reference value, the width may possibly be smaller than, equal to, or greater than the second reference value.

The gradation process (drawing command conversion process) of S25 is therefore executed in a manner described below with reference to FIG. 9(*b*).

In S25, it is first judged in S250 whether or not the entire width of the lateral-direction gradation pattern (total width of the two or more successive rectangles) is greater than the second reference value.

If the entire width of the lateral-direction gradation pattern is smaller than or equal to the second reference value (no in S250), the CPU 110 converts in S254 the rectangle drawing command group into a secondary drawing command for drawing the subject lateral-direction gradation pattern by repeatedly drawing in the longitudinal direction the lateral-direction gradation line.

On the other hand, if the entire width of the lateral-direction gradation pattern is greater than the second reference value (yes in S250), the rectangle drawing command group is divided in S252 into two or more rectangle drawing command groups. In other words, the two or more successive rectangles are divided into two or more rectangle groups. Each rectangle group is made from one or more successive rectangle, which is arranged successively along the main scanning direction. Each rectangle group has an entire width less than or equal to the second reference value (length of one record).

Then, the process proceeds to S254, in which the CPU 110 converts each rectangle drawing command group into a secondary drawing command.

In this way, if the entire width of the lateral-direction gradation pattern to be drawn based on the rectangle drawing command group is greater than the length of one record, the data transfer efficiency will inevitably fall and thus the execution of the gradation process 330 will become meaningless. In such a case, the original rectangle drawing command group is divided into two or more groups.

For example, if there are five consecutive drawing commands for consecutively drawing five rectangles in the main scanning direction, each having a width less than or equal to the first reference value, and if the total widths of the five consecutive rectangles exceed the width of one record (second reference value), the drawing commands for the five rectangles are divided into two groups. In other words, the five rectangles are split into two groups: one group having two successive rectangles and the other group having the other remaining three successive rectangles. In each group, the total width of the rectangles is less than or equal to the length of one record (second reference value). The first drawing command group for drawing the two successive rectangles is converted into a secondary drawing command for repeatedly drawing in the longitudinal direction a lateral-direction gradation line that constitutes the two rectangles. The second drawing command group for drawing the three successive rectangles is converted into another secondary drawing command for repeatedly drawing in the longitudinal direction another lateral-direction gradation line that constitutes the three rectangles. It is noted that in the above description, the rectangle drawing command group is divided into two groups. However, the rectangle drawing command group may be divided into more than two groups so that each group will have the width smaller than or equal to the second reference value, depending on the width of the original lateral-direction gradation pattern to be drawn by the original rectangle drawing command group.

In this way, if the total width of the successively-arranged rectangles exceeds the second reference value, the rectangles are divided into two or more groups so that the width of each group will be less than or equal to the second reference value. By setting the second reference value on the basis of the length of one record of the cache memory 120, it is possible to prevent any fall in the data transfer efficiency due to the conversion of graphic patterns.

Note that the second reference value need not necessarily be equal to the length of one record, but may be any data capacity that is smaller than or equal to one record as long as the second reference value is greater than the first reference value.

On the other hand, if no rectangle drawing command is held in the rectangular drawing command storage area 144 (NO in S21), the drawing command that is currently being analyzed is stored without change as an intermediate drawing command in the intermediate print command storage area 142 in S26.

Similarly, if some rectangle drawing command(s) that is held in the rectangular drawing command storage area 144 does not form any lateral-direction gradation pattern (NO in S23), the rectangle drawing command is accumulated without change as an intermediate drawing command in S26.

The judgment in S23 becomes negative when only one rectangle drawing command is stored in the rectangular drawing command storage area 144. The judgment in S23 becomes negative also when two or more rectangle drawing commands stored in the rectangular drawing command storage area 144 are for drawing rectangles separately from one another in the main scanning direction. The judgment in S23 becomes negative also when two or more rectangle drawing commands stored in the rectangular drawing command storage area 144 are for drawing rectangles with different heights along the auxiliary scanning direction.

The processes of S11 to S26 are repeated for all of the drawing commands included within the print commands. The rectangle drawing command group for drawing a lateral-direction gradation pattern is converted into a secondary drawing command for repeatedly drawing a lateral-direction gradation line in the longitudinal direction and is stored as an intermediate drawing command. All the other remaining drawing commands are accumulated unchanged as other intermediate drawing commands.

When a control command analyzed in S11 is a control command indicative of the end of the page (YES in S12 and S32), the intermediate print generation program is ended. At that time, print commands, whose efficiency has been improved through the conversion process of S25 for the lateral-direction gradation pattern, are stored as intermediate print commands in the intermediate print command storage area 142.

Then, the raster process 350 (see FIG. 7) is executed based on the intermediate print commands.

In this way, of the rectangle drawing command groups for drawing lateral-direction gradation patterns, only those rectangle drawing command groups that can be made more efficient by using the cache memory 120 are converted into the secondary drawing commands for drawing the lateral-direction gradation pattern by repeatedly drawing a lateral-direction gradation line in the longitudinal direction. This ensures that there is no likelihood of a paradoxical fall in the speed of drawing onto the virtual page, so that the generation of drawing data is efficient. The user can then obtain the printout 380 through the image forming process 370. It is possible to form an image onto a recording medium rapidly.

As described above, the laser printer 1 of the embodiment is designed to improve the drawing speed by converting a rectangle drawing command group for drawing a lateral-direction gradation pattern into a secondary drawing command for repeatedly drawing in the auxiliary scanning direction a lateral-direction gradation line and by accumulating the secondary drawing command as an intermediate drawing command. If there is a possibility that the drawing speed should paradoxically fall because of a drop in the hit rate of the cache, such as when the width of the rectangle in the lateral-direction gradation pattern is greater than the length of one record of the cache memory 120, it is possible to prevent decrease of the processing speed by not converting the drawing command group for such a lateral-direction gradation pattern.

It is possible to easily determine in S23 whether or not a string of consecutive graphic patterns constitutes a lateral-direction gradation pattern because the graphic patterns are rectangles as required in S13.

While the invention has been described in detail with reference to the specific embodiment thereof, it would be apparent to those skilled in the art that various changes and modifications may be made therein without departing from the spirit of the invention.

<First Modification>

For example, in the above-described embodiment, the first and second reference values are previously determined dependently on the length of one record of the cache memory 120. However, the first and second reference values may be previously determined dependently on the entire storage capacity of the cache memory 120.

If the data amount of a virtual-image for drawing one lateral-direction line in a lateral-direction gradation pattern is less than or equal to the entire storage capacity of the cache memory 120, the virtual-image stored in the cache memory 120 can be re-used to draw the entire lateral-direction gradation pattern. It is unnecessary to overwrite the contents of the cache memory 120. It is possible to improve the drawing speed for the lateral-direction gradation pattern.

It is now assumed that the storage capacity of the cache memory 120 is four kilobytes and that the CPU 110 generates drawing data that necessitates a storage capacity of one byte per pixel to represent a rectangle in a lateral-direction gradation pattern. In such a case, data of one lateral-direction gradation line that constitutes the lateral-direction gradation pattern can be stored in the cache memory 120 and can be reused if the amount of data in the one lateral-direction gradation line is less than or equal to four kilobytes, in other words, if the number of pixels arranged in the lateral-direction gradation line is less than or equal to 4,096.

It is desirable that the first reference value is of a size corresponding to a data amount that is approximately equal to a half of the maximum data amount that is capable of being stored in the cache memory 120. In such a case, the judgment of S15 becomes negative for a rectangle whose width is no more than 2,048 pixels.

Similarly, it is desirable that the second reference value is of a size corresponding to a data amount that is approximately equal to the maximum data amount that is capable of being stored in the cache memory 120. In such a case, the judgment of S250 becomes positive for a lateral-direction gradation pattern whose width is greater than 4,096 pixels. In such a case, the rectangles in the lateral-direction gradation pattern are divided in S252 into two or more groups. Each group is made from one or more successive rectangles with their total widths being no more than 4,096 pixels.

Note that the storage capacity of the cache memory 120 is not limited to four kilobytes and also that the first reference value is not necessarily limited to a size corresponding to approximately a half the storage capacity of the cache memory 120.

The first reference value may be any value less than the data capacity of the cache memory 120.

The second reference value may be any value less than or equal to the data capacity of the cache memory 120 as long as the second reference value is greater than the first reference value.

<Second Modification>

Instead, the first and second reference values can be previously determined dependently on the length of one page defined to manage the storage area of the RAM 140. The RAM 140 employs a DRAM as a storage element. Access to each storage portion in the RAM 140 is executed by designating a column address after designating a row address. If some storage portion (first storage portion) is accessed by designating a row address and then designating a column address, when desiring to access another storage portion (second storage portion) that is located on the same row address with the first storage portion, it is possible to access the second storage portion by simply designating the column address. Accordingly, if storage portions on the same row address are accessed in succession, it is possible to access the storage portions in succession by simply designating the corresponding column addresses.

Incidentally, the unit of storage portions that can be designated by a single row address is called a page (which differs from the manuscript page on which the image is formed), and the storage capacity for one page in DRAM will be referred to as "one page length" hereinafter. If the amount of data indicative of one lateral-direction gradation line in the lateral-direction gradation pattern is less than or equal to the length of one page, it is sufficient to specify, only once, the row address of the storage portions in order to store data of the entire line. It is possible to improve the drawing speed of the lateral-direction gradation pattern.

It is now assumed that the length of one page in the RAM 140 is 2,048 bytes and that the CPU 110 generates drawing data that necessitates a storage capacity of one byte per pixel to represent a rectangle in a lateral-direction gradation pattern. In such a case, data in one lateral-direction gradation line that constitutes the lateral-direction gradation pattern can be stored in a single page's worth of storage portions in the RAM 140 and can be reused if the amount of data in the one lateral-direction gradation line is less than or equal to 2,048 bytes, in other words, if the number of pixels arranged in the lateral-direction gradation line is less than or equal to 2,048.

It is desirable that the first reference value is of a size corresponding to a data amount that is approximately equal to a half of the maximum data amount that is capable of being stored in a single page's worth of storage portions in the RAM 140. In such a case, the judgment of S15 becomes negative for a rectangle whose width is no more than 1,024 pixels.

Similarly, it is desirable that the second reference value is of a size corresponding to a data amount that is approximately equal to the maximum data amount that is capable of being stored in a single page's worth of storage portions in the RAM 140. In such a case, the judgment of S250 becomes positive for a lateral-direction gradation pattern whose width is greater than 2,048 pixels. The rectangles in the lateral-direction gradation pattern are divided in S252 into two or more groups. Each group is made from one or more successive rectangles with their total widths being no more than 2,048 pixels.

Note that the length of one page in the RAM 140 is not limited to 2,048 bytes and also that the first reference value is not necessarily limited to a size corresponding to approximately a half the length of one page in the RAM 140.

The first reference value may be any value less than the length of one page in the RAM 140.

The second reference value may be any value less than or equal to the length of one page in the RAM 140 as long as the second reference value is greater than the first reference value.

<Third Modification>

If data transfer between the RAM 140 and the CPU 110 is executed in a burst mode, the first and second reference values can be previously determined dependently on the length of one burst. The RAM 140 employs a DRAM as a storage element. It is possible to successively access a plurality of storage portions that are arranged consecutively on a single row by designating a single column address only once. Such a transfer mode is called "burst mode" and the storage capacity of the successive storage portions that can be accessed consecutively by specifying the single column address will be referred to as "one burst length" hereinafter. If the amount of data in one lateral-direction gradation line in the lateral-direction gradation pattern is less than or equal to one burst length, it is sufficient to execute, only once, a column-address specifying operation in order to store data in the one lateral-direction gradation line in the RAM 140. It is possible to improve the drawing speed of the lateral-direction gradation pattern.

It is now assumed that the length of one burst in the RAM 140 is 32 bytes and that the CPU 110 generates drawing data that necessitates a storage capacity of one byte per pixel to represent a rectangle in a lateral-direction gradation pattern. In such a case, the data of One lateral-direction gradation line that constitutes the lateral-direction gradation pattern can be stored in one burst length's worth of storage portions in the RAM 140 and can be reused if the amount of data in the one lateral-direction gradation line is less than or equal to 32 bytes, in other words, if the number of pixels arranged in the lateral-direction gradation line is less than or equal to 32.

It is desirable that the first reference value is of a size corresponding to a data amount that is approximately equal to a half of the maximum data amount that is capable of being stored in a single burst length's worth of storage portions in the RAM 140. In such a case, the judgment of S15 becomes negative for a rectangle whose width is no more than 16 pixels.

Similarly, it is desirable that the second reference value is of a size corresponding to a data amount that is approximately equal to the maximum data amount that is capable of being stored in a single burst length's worth of storage portions in the RAM 140. In such a case, the judgment of S250 becomes positive for a lateral-direction gradation pattern whose width is greater than 32 pixels. The rectangles in the lateral-direction gradation pattern are divided in S252 into two or more groups. Each group is made from one or more successive rectangles with their total widths being no more than 32 pixels.

Note that the length of one burst of the RAM 140 is not limited to 32 bytes and also that the first reference value is not necessarily limited to a size corresponding to approximately a half the length of one burst in the RAM 140.

The first reference value may be any value less than the length of one burst in the RAM 140.

The second reference value may be any value less than or equal to the length of one burst in the RAM 140 as long as the second reference value is greater than the first reference value.

<Fourth Modification>

The first and second reference values can also be previously determined dependently on a data amount corresponding to the bus width of the data bus 170 that connects the RAM 140 and the CPU 110. In data transfer between the RAM 140 and the CPU 110, data whose amount corresponds to the bus width can be transferred simultaneously at each transfer. If the amount of data in one lateral-direction gradation line in the lateral-direction gradation pattern is less than or equal to the data amount corresponding to the bus width, it is possible to improve the drawing speed by transferring, only once, data of one lateral-direction gradation line, which will then be repeatedly drawn in the longitudinal direction. It is possible to reduce the time required for data transfer, and therefore it is possible to improve the drawing speed for drawing the gradation pattern.

It is now assumed that the data amount corresponding to the bus width is 64 bits and that the CPU 110 generates drawing data that necessitates a storage capacity of one byte per pixel to represent a rectangle in a lateral-direction gradation pattern. In such a case, the data of one lateral-direction gradation line that constitutes the lateral-direction gradation pattern can be transferred via a single transfer operation between the RAM 140 and the CPU 110 if the amount of data in the one lateral-direction gradation line is less than or equal to 64 bits, in other words, if the number of pixels arranged in the lateral-direction gradation line is less than or equal to eight.

It is desirable that the first reference value is of a size corresponding to a data amount that is approximately equal to a half of the maximum data amount that is capable of being transferred via a single transfer operation. In such a case, the judgment of S15 becomes negative for a rectangle whose width is no more than four pixels.

Similarly, it is desirable that the second reference value is of a size corresponding to a data amount that is approximately equal to the maximum data amount that is capable of being transferred via a single transfer operation. In such a case, the judgment of S250 becomes positive for a lateral-direction gradation pattern whose width is greater than eight pixels. The rectangles in the lateral-direction gradation pattern are divided in S252 into two or more groups. Each group is made from one or more successive rectangles with their total widths being no more than eight pixels.

Note that the data amount corresponding to the bus width is not limited to 64 bits and also that the first reference value is not necessarily limited to a size corresponding to approximately a half the data amount corresponding to the bus width.

The first reference value may be any value less than the data amount corresponding to the bus width.

The second reference value may be any value less than or equal to the data amount corresponding to the bus width as long as the second reference value is greater than the first reference value.

<Fifth Modification>

In the above description, a drawing command group for drawing a lateral-direction gradation pattern whose color tone varies in the main scanning direction is converted into a secondary drawing command for repeatedly drawing in the auxiliary scanning direction one lateral-direction gradation line that constitutes the lateral-direction gradation pattern and that extends in the main scanning direction. However, the secondary drawing command can be modified to repeatedly draw in the auxiliary scanning direction any number of successive lateral-direction gradation lines that constitute the lateral-direction gradation pattern, that extend in the main scanning direction, and that are arranged adjacent to one another in the auxiliary scanning direction. For example, the drawing command group can be converted into a secondary drawing command that repeatedly draws two or three successive lines that extend in the main scanning direction, that are arranged adjacent to one another in the auxiliary scanning direction, and that constitute the lateral-direction gradation pattern.

The present modification can be applied to any of the above-described modifications. By repeatedly drawing a plurality of successive lines, it is possible to reduce the number of times, at which the drawing processes are executed, in comparison with the case where only a single line is repeatedly drawn. It is possible to improve the drawing speed for the lateral-direction gradation pattern.

In this way, a drawing command group for drawing a lateral-direction gradation pattern is converted into a secondary drawing command for repeatedly drawing in the auxiliary scanning direction a predetermined number of scan lines in the lateral-direction gradation pattern. The contents of the secondary drawing command are simple. This decreases the data amount of the secondary drawing command and decreases the length of time required to convert the original drawing commands into the secondary drawing commands.

<Sixth Modification>

Furthermore, a drawing command group for drawing a lateral-direction gradation pattern may be divided into one or more drawing command that draws one or more image, respectively. In such a case, the original gradation pattern is divided into one or more image, each of which has an amount of data that is less than or equal to one page length, one burst length, or the like as described above to enable efficient data transfer.

The image processing method of the above-described embodiment can be applied not only to the laser printer 1 but also to other types of image forming devices, such as a photocopier, a facsimile machine, and a multifunction device, which form images on a recording medium. The image processing method of the above-described embodiment can be applied not only to image forming devices but also to image display devices such as a liquid-crystal monitor.

In the above description, the laser printer 1 starts executing the intermediate print command generation program (FIG. 9(*a*)) to start generating intermediate drawing commands after the laser printer 1 has completed receiving print commands from the host computer 200. However, the laser printer 1 may execute the intermediate print command generation program to generate intermediate drawing commands simultaneously while the laser printer 1 is receiving the print commands.

In the above description, the cache memory 120 is provided within the CPU 110, but may be provided outside the CPU 110.

In S23 of FIG. 9(*a*), rectangles are determined as constituting a lateral-direction gradation pattern (yes in S23) when the rectangles axe arranged in succession in the main scanning direction and when the heights of the rectangles are equal to one another.

However, the judgment of S23 may become positive even when the rectangles are not of the same height. If the judgment of S23 becomes positive when rectangles of different heights are disposed in sequence in the main scanning direction, the drawing commands for drawing the rectangles may be converted into secondary drawing commands in a manner described below.

For some line where one rectangle is not drawn but other rectangles are drawn, drawing commands for drawing the other rectangles are converted into a secondary drawing command for drawing the subject line. For each of the other lines where all the rectangles are drawn, drawing commands for drawing all the rectangles are converted into a secondary drawing command for drawing the subject line. It is possible to efficiently convert the drawing commands for all the rectangles on those lines where all of the rectangles are drawn.

What is claimed is:

1. An image processing device for creating, based on a drawing command, drawing data to be used for forming an image while scanning in a main scanning direction, the image processing device comprising:

storage means prestored with a predetermined first reference value;

command receiving means for receiving drawing commands in succession;

graphic determination means for determining whether or not a graphic pattern to be drawn by each drawing command has a predetermined shape;

graphic width determination means for determining, when the graphic determination means determines that the graphic pattern has the predetermined shape, whether or not a width of the graphic pattern in a main scanning direction is less than or equal to the first reference value;

graphic pattern determination means for holding the drawing command when the graphic width determination means determines that the width of the corresponding graphic pattern is less than or equal to the first reference value, and, determining, when the graphic pattern determination means holds a plurality of drawing commands, whether or not the graphic patterns indicated by the plurality of drawing commands constitute an array pattern, in which the corresponding graphic patterns are arranged consecutively in the main scanning direction;

command conversion means for converting, when the graphic pattern determination means determines that the plurality of graphic patterns indicated by the plurality of drawing commands constitute the array pattern, the plurality of drawing commands into one or more secondary drawing command to draw one or more secondary graphic pattern, the one or more secondary graphic pattern being defined by combining the plurality of graphic patterns together in the main scanning direction; and drawing data generation means for generating, based on the one or more secondary drawing command, drawing data to be used for forming the one or more secondary graphic pattern while scanning in the main scanning direction.

2. The image processing device as claimed in claim 1, wherein the command conversion means converts, when the graphic pattern determination means determines that the plurality of graphic patterns constitute the array pattern, the plurality of drawing commands into the one or more secondary drawing command to draw the one or more secondary graphic pattern, each secondary drawing command being for drawing a corresponding secondary graphic pattern by repeatedly drawing, in an auxiliary scanning direction, a predetermined number of scan line that extends in the main scanning direction, the auxiliary scanning direction extending substantially perpendicularly to the main scanning direction.

3. The image processing device as claimed in claim 1, further comprising a memory for storing the drawing data, wherein the drawing data generation means generates the drawing data and transfers the generated drawing data between the drawing data generation means and the memory in a transfer condition, the first reference value being previously determined dependently on the transfer condition.

4. The image processing device as claimed in claim 1, wherein the predetermined shape is a rectangle.

5. The image processing device as claimed in claim 1, further comprising image forming means for forming an image on a recording medium based on the drawing data while scanning in the main scanning direction.

6. The image processing device as claimed in claim 1, wherein the storage means is also prestored with a predetermined second reference value that is greater than the first reference value, and wherein each secondary graphic pattern has a width in the main scanning direction that is larger than the first reference value and that is smaller than or equal to the second reference value.

7. The image processing device as claimed in claim 6, further comprising a memory for storing the drawing data, wherein the drawing data generation means generates the drawing data and transfers the generated drawing data between the drawing data generation means and the memory in a transfer condition, the first reference value and the second reference value being previously determined dependently on the transfer condition.

8. The image processing device as claimed in claim 1,
wherein when the graphic pattern determination means determines that the plurality of graphic patterns indicated by the plurality of drawing commands fail to constitute an array pattern, the command conversion means fails to convert the plurality of drawing commands, and further comprising:

a main storage device having an intermediate drawing command storage area and a drawing data storage area, the intermediate drawing command storage area being for storing, as intermediate drawing commands, the secondary drawing command that is produced by the command conversion means when the command conversion means converts the drawing commands into the secondary drawing command, and the drawing command when the command conversion means fails to convert the drawing command, the drawing data storage area being for storing the drawing data produced by the drawing data generation means.

9. The image processing device as claimed in claim 8, further comprising a cache memory, the drawing data generation means generating the drawing data while transferring the generated drawing data between the cache memory and the drawing data storage area.

10. The image processing device as claimed in claim 9, wherein the drawing data storage area has a plurality of record areas, and the cache memory has several record areas, each record area in the drawing data storage area having a record length equal to that of each record area in the cache memory, data transfer being executed between the main storage device and the cache memory by successive data units, each data unit having a data amount corresponding to the record length, the first reference value being previously determined dependently on a data amount corresponding to the record length.

11. The image processing device as claimed in claim 10,
wherein the storage means is also prestored with a predetermined second reference value that is greater than the first reference value, and
wherein each secondary graphic pattern has a width in the main scanning direction that is larger than the first reference value and that is smaller than or equal to the second reference value, the second reference value being smaller than or equal to a width corresponding to the record length.

12. The image processing device as claimed in claim 9, wherein the cache memory has a data capacity, the first reference value being previously determined dependently on a data amount corresponding to the data capacity.

13. The image processing device as claimed in claim 12,
wherein the storage means is also prestored with a predetermined second reference value that is greater than the first reference value, and
wherein each secondary graphic pattern has a width in the main scanning direction that is larger than the first reference value and that is smaller than or equal to the second reference value, the second reference value being smaller than or equal to a width corresponding to the data capacity.

14. The image processing device as claimed in claim 8, wherein the drawing data generation means accesses each storage portion in the drawing data storage area of the main storage device by designating a row address and a column address of the each storage portion, the drawing data generation means successively accessing storage portions in one page's worth of storage area with a single row address in the drawing data storage area by successively designating column addresses without addressing the corresponding row address, and wherein the first reference value is previously determined dependently on a data amount corresponding to a length of the one page's worth of storage area.

15. The image processing device as claimed in claim 14,
wherein the storage means is also prestored with a predetermined second reference value that is greater than the first reference value, and
wherein each secondary graphic pattern has a width in the main scanning direction that is larger than the first reference value and that is smaller than or equal to the second reference value, the second reference value being smaller than or equal to a width corresponding to the length of the one page's worth of storage area.

16. The image processing device as claimed in claim 8, wherein the drawing data generation means accesses each storage portion in the drawing data storage area of the main storage device by designating a row address and a column address of the each storage portion, the drawing data generation means accessing, during a burst mode, a plurality of successive storage portions having a single row address by designating a single column address once, the plurality of successive storage portions being defined in a storage area having one burst length, and wherein the first reference value is previously determined dependently on a data amount corresponding to the one burst length.

17. The image processing device as claimed in claim 16,
wherein the storage means is also prestored with a predetermined second reference value that is greater than the first reference value, and
wherein each secondary graphic pattern has a width in the main scanning direction that is larger than the first reference value and that is smaller than or equal to the second reference value, the second reference value being smaller than or equal to a width corresponding to the one burst length.

18. The image processing device as claimed in claim 8, further comprising a data bus connected between the drawing data generation means and the main storage device, and
wherein the first reference value is previously determined dependently on a width of the data bus.

19. The image processing device as claimed in claim 18,
wherein the storage means is also prestored with a predetermined second reference value that is greater than the first reference value, and
wherein each secondary graphic pattern has a width in the main scanning direction that is larger than the first reference value and that is smaller than or equal to the second reference value, the second reference value being smaller than or equal to a width corresponding to the width of the data bus.

20. An image processing device for creating, based on a drawing command, drawing data to be used for forming an image while scanning in a main scanning direction, the image processing device comprising:

a storage portion prestored with a predetermined first reference value:

a memory; and a controller that receives drawing commands in succession, that determines whether or not a graphic pattern to be drawn by each drawing command has a predetermined shape, that determines, when the graphic pattern has the predetermined shape, whether or not a width of the graphic pattern in a main scanning direction is less than or equal to the first reference value, that holds in the memory the drawing command when the width of the corresponding graphic pattern is less than or equal to the first reference value, that determines, when a plurality of drawing commands are held in the memory, whether or not the graphic patterns indicated by the plurality of drawing commands constitute an array pattern, in which the corresponding graphic patterns are arranged consecutively in the main scanning direction, that converts, when the plurality of graphic patterns indicated by the plurality of drawing commands constitute the array pattern, the plurality of drawing commands into one or more secondary drawing command to draw one or more secondary graphic pattern, the one or more secondary graphic pattern being defined by combining the plurality of graphic patterns together in the main scanning direction, and that generates, based on the one or more secondary drawing command, drawing data to be used for forming the one or more secondary graphic pattern while scanning in the main scanning direction.

21. The image processing device as claimed in claim 20, wherein the controller generates the drawing data while transferring the generated drawing data between the controller and the memory in a transfer condition, the first reference value being previously determined dependently on the transfer condition.

22. The image processing device as claimed in claim 21, wherein the storage portion is also prestored with a predetermined second reference value that is greater than the first reference value, wherein each secondary graphic pattern has a width in the main scanning direction that is larger than the first reference value and that is smaller than or equal to the second reference value, wherein the second reference value is previously determined dependently on the transfer condition.

* * * * *